US011910416B2

(12) United States Patent
Khoshnevisan et al.

(10) Patent No.: US 11,910,416 B2
(45) Date of Patent: Feb. 20, 2024

(54) DEFAULT QUASI-COLOCATION FOR SINGLE DOWNLINK CONTROL INFORMATION-BASED MULTIPLE TRANSMISSION RECEPTION POINTS

(71) Applicant: QUALCOMM Incorporated, San Diego, CA (US)

(72) Inventors: Mostafa Khoshnevisan, San Diego, CA (US); Peter Gaal, San Diego, CA (US); Xiaoxia Zhang, San Diego, CA (US); Yan Zhou, San Diego, CA (US); Tao Luo, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/036,991

(22) Filed: Sep. 29, 2020

(65) Prior Publication Data

US 2021/0112560 A1    Apr. 15, 2021

Related U.S. Application Data

(60) Provisional application No. 62/914,403, filed on Oct. 11, 2019.

(51) Int. Cl.
*H04W 72/53* (2023.01)
*H04W 72/044* (2023.01)
(Continued)

(52) U.S. Cl.
CPC ........... *H04W 72/53* (2023.01); *H04L 5/0092* (2013.01); *H04L 5/0094* (2013.01);
(Continued)

(58) Field of Classification Search
CPC ............. H04W 72/1289; H04W 16/28; H04W 72/042; H04W 72/046; H04L 5/0092
See application file for complete search history.

(56) References Cited

U.S. PATENT DOCUMENTS

2018/0343653 A1    11/2018  Guo
2019/0239093 A1*   8/2019   Zhang .................... H04L 5/001
(Continued)

FOREIGN PATENT DOCUMENTS

WO    WO-2019066618 A1 *  4/2019   ............... H04B 7/01
WO    WO-2019099659 A1    5/2019
(Continued)

OTHER PUBLICATIONS

ASUSTEK: "Enhancements on Multiple TRP or Panel Transmission", 3GPP Draft, R1-1907443, 3GPP TSG RAN WG1 #97, Enhancements on Multiple TRP or Panel Transmission, 3rd Generation Partnership Project (3GPP), Mobile Competence Centre , 650, Route Des Lucioles , F-06921 Sophia-Antipolis Cede, vol. RAN WG1, No. Reno, USA, May 13, 2019-May 17, 2019, May 13, 2019 (May 13, 2019), XP051728875, 4 Pages, Retrieved from the Internet: URL:http://www.3gpp.org/ftp/Meetings%5F3GPP%5FSYNC/RAN1/Docs/R1%2D1907443%2Ezip [retrieved on May 13, 2019].
(Continued)

*Primary Examiner* — Jael M Ulysse
(74) *Attorney, Agent, or Firm* — Holland & Hart LLP

(57) ABSTRACT

Methods, systems, and devices for wireless communications are described. A communication device, which may be otherwise known as user equipment (UE) may receive a downlink control information (DCI) on a physical downlink control channel (PDCCH). The DCI may include one or more of an indication of a set of transmission configuration indicator (TCI) states related to a physical downlink shared channel (PDSCH), one or more receive beams associated with the set of TCI states, or a physical downlink shared
(Continued)

channel (PDSCH) scheme. The UE may decode the DCI and may determine a temporal period associated with the indication of the set of TCI states. The UE may receive, based on the temporal period, the PDSCH according to one or more of the set of TCI states, the one or more receive beams associated with the set of TCI states, the PDSCH scheme, or one or more default receive beams.

37 Claims, 17 Drawing Sheets

(51) Int. Cl.
*H04L 5/00* (2006.01)
*H04W 8/24* (2009.01)
*H04W 72/23* (2023.01)

(52) U.S. Cl.
CPC .............. *H04L 5/0098* (2013.01); *H04W 8/24* (2013.01); *H04W 72/046* (2013.01); *H04W 72/23* (2023.01)

(56) References Cited

U.S. PATENT DOCUMENTS

| | | | | |
|---|---|---|---|---|
| 2019/0253308 | A1* | 8/2019 | Huang | H04L 43/0823 |
| 2019/0281587 | A1* | 9/2019 | Zhang | H04W 72/23 |
| 2019/0297603 | A1* | 9/2019 | Guo | H04L 5/0053 |
| 2019/0306801 | A1* | 10/2019 | Zhou | H04W 52/04 |
| 2019/0306848 | A1* | 10/2019 | Zhou | H04W 72/20 |
| 2020/0077395 | A1* | 3/2020 | Guo | H04W 72/0446 |
| 2020/0178239 | A1* | 6/2020 | Yi | H04W 16/28 |
| 2020/0196383 | A1* | 6/2020 | Tsai | H04L 1/1614 |
| 2020/0221428 | A1* | 7/2020 | Moon | H04B 7/088 |
| 2020/0288479 | A1* | 9/2020 | Xi | H04W 76/27 |
| 2020/0313796 | A1* | 10/2020 | Park | H04L 1/0027 |
| 2020/0314881 | A1* | 10/2020 | Bagheri | H04L 5/10 |
| 2020/0337058 | A1 | 10/2020 | Song et al. | |
| 2020/0351129 | A1* | 11/2020 | Kwak | H04W 72/53 |
| 2020/0351892 | A1* | 11/2020 | Yi | H04L 5/0092 |
| 2021/0022152 | A1* | 1/2021 | Yang | H04W 72/56 |
| 2021/0051635 | A1* | 2/2021 | Lo | H04B 7/024 |
| 2021/0344440 | A1* | 11/2021 | Yoshioka | H04W 52/146 |
| 2022/0029737 | A1* | 1/2022 | Park | H04L 1/0057 |
| 2022/0103325 | A1* | 3/2022 | Chen | H04L 5/0023 |
| 2022/0104237 | A1* | 3/2022 | Muruganathan | H04W 72/51 |
| 2022/0225120 | A1* | 7/2022 | Matsumura | H04L 5/0051 |

FOREIGN PATENT DOCUMENTS

| | | | | |
|---|---|---|---|---|
| WO | WO-2019153347 | A1 | 8/2019 | |
| WO | WO-2020201995 | A1 * | 10/2020 | H04L 5/0023 |
| WO | WO-2020225692 | A1 * | 11/2020 | H04L 5/0023 |
| WO | WO-2020230217 | A1 * | 11/2020 | H04L 5/0051 |

OTHER PUBLICATIONS

Huawei., et al., "Enhancements on Multi-TRP/Panel Transmission", 3GPP Draft, R1-1910073, 3GPP TSG RAN WG1 Meeting #98bis, 3rd Generation Partnership Project (3GPP), Mobile Competence Centre, 650, Route Des Lucioles, F-06921 Sophia-Antipolis Cedex , France, vol. RAN WG1, No. Chongqing, China, Oct. 14, 2019-Oct. 20, 2019, Oct. 5, 2019 (Oct. 5, 2019), XP051788880, Retrieved from the Internet: URL:http://www.3gpp.org/ftp/tsg_ran/WG1_RL1/TSGR1_98b/Docs/R1-1910073.zip [retrieved on Oct. 5, 2019], p. 16-p. 17.
International Search Report and Written Opinion—PCT/US2020/053618—ISA/EPO—dated Apr. 6, 2021.
NEC: "Discussion on Multi-TRP Operation", 3GPP Draft, 3GPP TSG RAN WG1 #98b, R1-1910567, 3rd Generation Partnership Project (3GPP), Mobile Competence Centre, 650, Route Des Lucioles, F-06921 Sophia-Antipolis Cedex, France, vol. RAN WG1, No. Chongqing, CN, Oct. 14, 2019-Oct. 20, 2019, Oct. 4, 2019 (Oct. 4, 2019), XP051808233, 4 Pages, Retrieved from the Internet: URL: https://ftp.3gpp.org/tsg_ran/WG1_RL1/TSGR1_98b/Docs/R1-1910567.zip.RL1/TR1-1910567.docx [retrieved on Oct. 4, 2019] section 3, Section 2.
NTT Docomo Inc: "Enhancements on Multi-TRP/Panel Transmission", 3GPP Draft, R1-1911184, 3GPP TSG RAN WG1 #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 33 Pages, Oct. 4, 2019 (Oct. 4, 2019), XP051808317, Retrieved from the Internet: URL: https://ftp.3gpp.org/tsg_ran/WG1_RL1/TSGR1_98b/Docs/R1-1911184.zip R1-1911184.docx [retrieved on Oct. 4, 2019] pp. 11-13, Section 1, Section 2.1.1, Section 2.2.1, the whole document.
Partial International Search Report—PCT/US2020/053618—ISA/EPO—dated Dec. 18, 2020.
ZTE: "Enhancements on Multi-TRP and Multi-Panel Transmission", 3GPP TSG RAN WG1 #98, 3GPP Draft; R1-1908191 Enhancements on Multi-TRP and Multi-Panel Transmission, 3rd Generation Partnership Project (3GPP), Mobile Competence Centre; 650, Route Des Lucioles; F-06921 Sophia-Antipolis, vol. RAN WG1, No. Prague, CZ; Aug. 26, 2019-Aug. 30, 2019, Aug. 17, 2019 (Aug. 17, 2019), 21 Pages, XP051764810, Retrieved from the Internet: URL: http://www.3gpp.org/ftp/tsg_ran/WG1_RL1/TSGR1_98/Docs/R1-1908191.zip [retrieved on Aug. 17, 2019] the whole document, pp. 5,17,18.

* cited by examiner

DEFAULT QUASI-COLOCATION FOR SINGLE DOWNLINK CONTROL INFORMATION-BASED MULTIPLE TRANSMISSION RECEPTION POINTS

CROSS REFERENCE

The present application for patent claims the benefit of U.S. Provisional Patent Application No. 62/914,403 by KHOSHNEVISAN et al., entitled "DEFAULT QUASI-CO-LOCATION FOR SINGLE DOWNLINK CONTROL INFORMATION-BASED MULTIPLE TRANSMISSION RECEPTION POINTS," filed Oct. 11, 2019, assigned to the assignee hereof, and expressly incorporated by reference herein.

FIELD OF TECHNOLOGY

The following relates generally to wireless communications and more specifically to default quasi-colocation (QCL) for single downlink control information (DCI)-based multiple transmission reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques may relate to configuring a communication device, which may be otherwise known as user equipments (UEs), to support default quasi-colocation (QCL) for single downlink control information (DCI)-based multiple transmission reception points (TRPs). The communication device may be configured, in some examples, to receive a DCI on a physical downlink control channel (PDCCH). The DCI may include one or more of an indication of a set of transmission configuration indicator (TCI) states related to a physical downlink shared channel (PDSCH), one or more receive beams associated with the set of TCI states, or a PDSCH scheme. The UE may decode the DCI, and determine a temporal period associated with the indication of the set of TCI states. The UE may receive, based on the temporal period, the PDSCH according to one or more of the set of TCI states, the one or more receive beams associated with the set of TCI states, the PDSCH scheme, or one or more default receive beams. The communication device may, as a result, include features for improvements to power consumption, spectral efficiency, higher data rates and, in some examples, may promote enhanced efficiency for high reliability and low latency operations, among other benefits by supporting default QCL for single DCI-based multiple TRPs.

A method of wireless communication is described. The method may include receiving a DCI on a PDCCH, the DCI including one or more of an indication of a set of TCI states related to a PDSCH, one or more receive beams associated with the set of TCI states, or a PDSCH scheme, decoding the DCI, determining a temporal period associated with the indication of the set of TCI states, and receiving, based on the temporal period, the PDSCH according to one or more of the set of TCI states, the one or more receive beams associated with the set of TCI states, the PDSCH scheme, or one or more default receive beams.

An apparatus for wireless communication is described. The apparatus may include a processor, memory coupled with the processor, and instructions stored in the memory. The instructions may be executable by the processor to cause the apparatus to receive a DCI on a PDCCH, the DCI including one or more of an indication of a set of TCI states related to a PDSCH, one or more receive beams associated with the set of TCI states, or a PDSCH scheme, decode the DCI, determine a temporal period associated with the indication of the set of TCI states, and receive, based on the temporal period, the PDSCH according to one or more of the set of TCI states, the one or more receive beams associated with the set of TCI states, the PDSCH scheme, or one or more default receive beams.

Another apparatus for wireless communication is described. The apparatus may include means for receiving a DCI on a PDCCH, the DCI including one or more of an indication of a set of TCI states related to a PDSCH, one or more receive beams associated with the set of TCI states, or a PDSCH scheme, decoding the DCI, determining a temporal period associated with the indication of the set of TCI states, and receiving, based on the temporal period, the PDSCH according to one or more of the set of TCI states, the one or more receive beams associated with the set of TCI states, the PDSCH scheme, or one or more default receive beams.

A non-transitory computer-readable medium storing code for wireless communication is described. The code may include instructions executable by a processor to receive a DCI on a PDCCH, the DCI including one or more of an indication of a set of TCI states related to a PDSCH, one or more receive beams associated with the set of TCI states, or a PDSCH scheme, decode the DCI, determine a temporal period associated with the indication of the set of TCI states, and receive, based on the temporal period, the PDSCH according to one or more of the set of TCI states, the one or more receive beams associated with the set of TCI states, the PDSCH scheme, or one or more default receive beams.

Some examples of the method, apparatuses, and non-transitory computer-readable medium described herein may further include operations, features, means, or instructions for identifying a capability relating to the one or more receive beams, and selecting one or more of the set of TCI states, the one or more receive beams associated with the set of TCI states, the PDSCH scheme, or one or more default receive beams based on the capability, where receiving the PDSCH may be based on the selecting.

Some examples of the method, apparatuses, and non-transitory computer-readable medium described herein may further include operations, features, means, or instructions for including an indication of the temporal period in the capability, and transmitting the capability carrying the indication of the temporal period.

Some examples of the method, apparatuses, and non-transitory computer-readable medium described herein may further include operations, features, means, or instructions for identifying a TCI field in the DCI, where the TCI field indicates one or more TCI states of the set of TCI states.

Some examples of the method, apparatuses, and non-transitory computer-readable medium described herein may further include operations, features, means, or instructions for determining that a temporal offset period may be greater than or equal to the temporal period, where receiving the PDSCH includes receiving, based on the temporal offset period being greater than or equal to the temporal period, the PDSCH according to one or more of the one or more TCI states of the set of TCIs states or the PDSCH scheme.

In some examples of the method, apparatuses, and non-transitory computer-readable medium described herein, the temporal offset period includes a duration from an ending symbol of the PDCCH carrying the DCI to a beginning symbol of the PDSCH, where the PDCCH schedules the PDSCH.

Some examples of the method, apparatuses, and non-transitory computer-readable medium described herein may further include operations, features, means, or instructions for determining that a temporal offset period may be lesser than the temporal period, receiving, based on that the temporal offset period being lesser than the temporal period, a first data sample set in accordance with a first default receive beam of the one or more default receive beams, or the PDSCH scheme, and receiving, based on that the temporal offset period being lesser than the temporal period, a second data sample set in accordance with a second default receive beam of the set of default receive beams, or the PDSCH scheme.

Some examples of the method, apparatuses, and non-transitory computer-readable medium described herein may further include operations, features, means, or instructions for storing one or more of the first data sample set or the second data sample set based on that the temporal offset period being lesser than the temporal period, where the stored first data sample set or the stored second data sample set correspond to a first antenna panel or a second antenna panel.

Some examples of the method, apparatuses, and non-transitory computer-readable medium described herein may further include operations, features, means, or instructions for processing one or more of the first data sample set or the second data sample set based on the PDSCH scheme, where the PDSCH scheme includes a spatial division multiplexing (SDM) scheme.

Some examples of the method, apparatuses, and non-transitory computer-readable medium described herein may further include operations, features, means, or instructions for processing one or more of the first data sample set or the second data sample set based on the set of TCI states.

Some examples of the method, apparatuses, and non-transitory computer-readable medium described herein may further include operations, features, means, or instructions for processing one or more of the first data sample set or the second data sample set based on the PDSCH scheme, where the PDSCH scheme includes a frequency division multiplexing (FDM) scheme, where processing one or more of the first data sample set or the second data sample set includes, processing the first data sample set in a first set of resource blocks corresponding to a first TCI state of the TCI states, and processing the second data sample set in a second set of resource blocks corresponding to a second TCI state of the TCI states.

Some examples of the method, apparatuses, and non-transitory computer-readable medium described herein may further include operations, features, means, or instructions for processing one or more of the first data sample set or the second data sample set based on the PDSCH scheme, where the PDSCH scheme includes a time division multiplexing (TDM) scheme, where processing one or more of the first data sample set or the second data sample set includes, processing the first data sample set in a first set of transmission time intervals (TTIs) corresponding to a first TCI state of the TCI states, and processing the second data sample set in a second set of set of TTIs corresponding to a second TCI state of the TCI states.

Some examples of the method, apparatuses, and non-transitory computer-readable medium described herein may further include operations, features, means, or instructions for determining a second temporal period to decode the DCI, and transmitting, with the capability, a second indication of the second temporal period related to decode the DCI.

In some examples of the method, apparatuses, and non-transitory computer-readable medium described herein, the temporal period may be different from the second temporal period.

In some examples of the method, apparatuses, and non-transitory computer-readable medium described herein, the second temporal period may be smaller than the temporal period.

In some examples of the method, apparatuses, and non-transitory computer-readable medium described herein, the temporal period relates to one or more of a quantity of symbols to receive the PDCCH, and apply spatial QCL information for the PDSCH.

Some examples of the method, apparatuses, and non-transitory computer-readable medium described herein may further include operations, features, means, or instructions for determining a quantity of symbols to receive the PDCCH based on the temporal period, applying spatial QCL information for the PDSCH, and receiving the PDSCH based on the spatial QCL information.

Some examples of the method, apparatuses, and non-transitory computer-readable medium described herein may further include operations, features, means, or instructions for determining that a temporal offset period may be greater than or equal to the second temporal period, and determining that the temporal offset period may be lesser than or equal to the temporal period, where receiving the PDSCH includes receiving, based on one or more of the temporal offset period being greater than or equal to the second temporal period or the temporal offset period being lesser than or equal to the temporal period, the PDSCH according to one or more of the set of TCI states, the one or more receive beams associated with the set of TCI states, or one or more default receive beams for the PDSCH.

Some examples of the method, apparatuses, and non-transitory computer-readable medium described herein may further include operations, features, means, or instructions for determining that a temporal offset period may be lesser than the second temporal period, where receiving the PDSCH includes receiving, based on the temporal offset period being lesser than the second temporal period, the PDSCH according to one or more of the one or more default receive beams or a default PDSCH scheme for the PDSCH.

In some examples of the method, apparatuses, and non-transitory computer-readable medium described herein, the default PDSCH scheme may be based on a set of preconfigured PDSCH schemes.

In some examples of the method, apparatuses, and non-transitory computer-readable medium described herein, the default receive beam may be based on a set of preconfigured receive beams.

In some examples of the method, apparatuses, and non-transitory computer-readable medium described herein, the PDSCH scheme or the default PDSCH scheme includes a single-TCI state scheme, a TDM scheme, an FDM scheme, an SDM scheme, or a code division multiplexing (CDM) scheme.

Some examples of the method, apparatuses, and non-transitory computer-readable medium described herein may further include operations, features, means, or instructions for receiving the PDSCH over a duration, where the duration includes a transmission occasion, a TTI, and the TTI including one or more OFDM symbols, one or more mini-slots, one or more slots, or a combination thereof.

Some examples of the method, apparatuses, and non-transitory computer-readable medium described herein may further include operations, features, means, or instructions for operating, during a first portion of a duration, according to one or more of the set of TCI states, the one or more receive beams associated with the set of TCI states, the PDSCH scheme, one or more default receive beams, or the default PDSCH scheme, and operating, during a second portion of the duration, according to one or more of the set of TCI states, the one or more receive beams associated with the set of TCI states, the PDSCH scheme, one or more default receive beams, or the default PDSCH scheme.

Some examples of the method, apparatuses, and non-transitory computer-readable medium described herein may further include operations, features, means, or instructions for performing, during the first portion, a channel measurement estimation related to one or more of the PDCCH or the PDSCH based on one or more of the set of TCI states, the one or more receive beams associated with the set of TCI states, the PDSCH scheme, one or more default receive beams, or a default PDSCH scheme.

Some examples of the method, apparatuses, and non-transitory computer-readable medium described herein may further include operations, features, means, or instructions for performing, during the second portion, a channel measurement estimation related to one or more of the PDCCH or the PDSCH based on one or more of the set of TCI states, the one or more receive beams associated with the set of TCI states, the PDSCH scheme, one or more default receive beams, or a default PDSCH scheme.

Some examples of the method, apparatuses, and non-transitory computer-readable medium described herein may further include operations, features, means, or instructions for determining a difference between the first portion and the second portion based on the one or more of the set of TCI states, the one or more receive beams associated with the set of TCI states, the PDSCH scheme, one or more default receive beams, or a default PDSCH scheme, and determining a reference signal location in the second portion of the duration based on the difference.

In some examples of the method, apparatuses, and non-transitory computer-readable medium described herein, the reference signal location includes a demodulation reference signal (DMRS) location.

In some examples of the method, apparatuses, and non-transitory computer-readable medium described herein, the reference signal location includes a beginning symbol of the second portion of the duration.

In some examples of the method, apparatuses, and non-transitory computer-readable medium described herein, determining the reference signal location in the second portion of the duration may be further based on a length of one or more of the PDCCH or the PDSCH.

In some examples of the method, apparatuses, and non-transitory computer-readable medium described herein, determining the reference signal location in the second portion of the duration may be further based on a second temporal period to decode the DCI.

In some examples of the method, apparatuses, and non-transitory computer-readable medium described herein, the second temporal period includes a quantity of symbols.

Some examples of the method, apparatuses, and non-transitory computer-readable medium described herein may further include operations, features, means, or instructions for determining a subcarrier spacing based on a capability, where determining the second temporal period may be based on the subcarrier spacing.

A method of wireless communication is described. The method may include identifying, based on a control resource set (CORESET) identifier, a first default receive beam of a set of default receive beams, receiving an indication of a second default receive beam of the set of default receive beams, determining the second default receive beam based on the indication, and receiving one or more data samples for PDSCHs jointly over the first default receive beam and the second default receive beam.

An apparatus for wireless communication is described. The apparatus may include a processor, memory coupled with the processor, and instructions stored in the memory. The instructions may be executable by the processor to cause the apparatus to identify, based on a CORESET identifier, a first default receive beam of a set of default receive beams, receive an indication of a second default receive beam of the set of default receive beams, determine the second default receive beam based on the indication, and receive one or more data samples for PDSCHs jointly over the first default receive beam and the second default receive beam.

Another apparatus for wireless communication is described. The apparatus may include means for identifying, based on a CORESET identifier, a first default receive beam of a set of default receive beams, receiving an indication of a second default receive beam of the set of default receive beams, determining the second default receive beam based on the indication, and receiving one or more data samples for PDSCHs jointly over the first default receive beam and the second default receive beam.

A non-transitory computer-readable medium storing code for wireless communication is described. The code may include instructions executable by a processor to identify, based on a CORESET identifier, a first default receive beam of a set of default receive beams, receive an indication of a second default receive beam of the set of default receive beams, determine the second default receive beam based on the indication, and receive one or more data samples for PDSCHs jointly over the first default receive beam and the second default receive beam.

In some examples of the method, apparatuses, and non-transitory computer-readable medium described herein, the CORESET identifier may be a lowest CORESET identifier in an ending symbol or an ending slot associated with a transmission occasion.

Some examples of the method, apparatuses, and non-transitory computer-readable medium described herein may further include operations, features, means, or instructions for monitoring one or more CORESETs within an active bandwidth part associated with a serving cell, and the CORESET identifier is a lowest CORESET identifier in a latest symbol or a latest slot that a CORESET is monitored within the active bandwidth part associated with the serving cell.

Some examples of the method, apparatuses, and non-transitory computer-readable medium described herein may further include operations, features, means, or instructions for receiving, in a first control signaling, an additional indication of the first default receive beam of the set of receive beams, where the first control signaling includes a first MAC-CE signaling.

Some examples of the method, apparatuses, and non-transitory computer-readable medium described herein may further include operations, features, means, or instructions for receiving, in a second control signaling, the indication of the second default receive beam of the set of default receive beams, where the second control signaling includes a second MAC-CE signaling.

Some examples of the method, apparatuses, and non-transitory computer-readable medium described herein may further include operations, features, means, or instructions for receiving, in a control signaling, one or more of the indication of the second default receive beam of the set of default receive beams or the additional indication of the first default receive beam of the set of default receive beams, where the control signaling includes a MAC-CE signaling.

In some examples of the method, apparatuses, and non-transitory computer-readable medium described herein, the control signaling includes a TCI states pattern indicating one or more TCI states related to one or more periods.

In some examples of the method, apparatuses, and non-transitory computer-readable medium described herein, the TCI states pattern corresponds to one or more of a periodicity associated with TCI states, a duration associated with the TCI states, or a temporal offset period associated with the TCI states.

In some examples of the method, apparatuses, and non-transitory computer-readable medium described herein, the first default receive beam of the set of default receive beams may be different from the second default receive beam of the set of default receive beams over one or more periods.

In some examples of the method, apparatuses, and non-transitory computer-readable medium described herein, the one or more periods relate to one or more TTIs including one or more symbols, one or more mini-slots, one or more slots, or a combination thereof.

A method of wireless communication is described. The method may include identifying, based on a first CORESET identifier, a first default receive beam of a set of default receive beams, determining, based on a second CORESET identifier, a second default receive beam of the set of default receive beams, and receiving one or more data samples for PDSCHs jointly over the first default receive beam and the second default receive beam.

An apparatus for wireless communication is described. The apparatus may include a processor, memory coupled with the processor, and instructions stored in the memory. The instructions may be executable by the processor to cause the apparatus to identify, based on a first CORESET identifier, a first default receive beam of a set of default receive beams, determine, based on a second CORESET identifier, a second default receive beam of the set of default receive beams, and receive one or more data samples for PDSCHs jointly over the first default receive beam and the second default receive beam.

Another apparatus for wireless communication is described. The apparatus may include means for identifying, based on a first CORESET identifier, a first default receive beam of a set of default receive beams, determining, based on a second CORESET identifier, a second default receive beam of the set of default receive beams, and receiving one or more data samples for PDSCHs jointly over the first default receive beam and the second default receive beam.

A non-transitory computer-readable medium storing code for wireless communication is described. The code may include instructions executable by a processor to identify, based on a first CORESET identifier, a first default receive beam of a set of default receive beams, determine, based on a second CORESET identifier, a second default receive beam of the set of default receive beams, and receive one or more data samples for PDSCHs jointly over the first default receive beam and the second default receive beam.

In some examples of the method, apparatuses, and non-transitory computer-readable medium described herein, the first CORESET identifier may be a first lowest CORESET identifier in a latest symbol or a latest slot that a CORESET is monitored within an active bandwidth part associated with a serving cell.

In some examples of the method, apparatuses, and non-transitory computer-readable medium described herein, the second CORESET identifier may be a second lowest CORESET identifier in the ending symbol or the ending slot associated with the transmission occasion.

In some examples of the method, apparatuses, and non-transitory computer-readable medium described herein, the first CORESET identifier may be different from the second CORESET identifier.

In some examples of the method, apparatuses, and non-transitory computer-readable medium described herein, the first CORESET identifier corresponds to a first TCI state.

In some examples of the method, apparatuses, and non-transitory computer-readable medium described herein, the second CORESET identifier corresponds to a second TCI state different from the first TCI state.

Some examples of the method, apparatuses, and non-transitory computer-readable medium described herein may further include operations, features, means, or instructions for receiving control signaling including an indication of a pair of default receive beams corresponding to a TCI state pair, where the set of default receive beams includes the pair of default receive beams.

In some examples of the method, apparatuses, and non-transitory computer-readable medium described herein, the control signaling includes radio resource control (RRC) signaling.

In some examples of the method, apparatuses, and non-transitory computer-readable medium described herein, the control signaling includes MAC-CE signaling.

Some examples of the method, apparatuses, and non-transitory computer-readable medium described herein may further include operations, features, means, or instructions for determining the second default receive beam of the set of default receive beams based on a first TCI state associated with the first default receive beam that may be paired with a second TCI state associated with the second default receive beam.

DETAILED DESCRIPTION

Some wireless communication systems may include one or more communication devices, such as user equipments (UEs) and base stations, for example, next-generation NodeBs or giga-NodeBs (either of which may be referred to as a gNB) that may support multiple radio access technologies including 4G systems such as Long Term Evolution (LTE) systems, fifth generation (5G) systems which may be referred to as New Radio (NR) systems. A UE may be configured to receive a downlink control information (DCI) on a physical downlink control channel (PDCCH). The DCI may include one or more of an indication of a set of transmission configuration indicator (TCI) states related to a physical downlink shared channel (PDSCH), one or more receive beams associated with the set of TCI states, or a PDSCH scheme. The UE may decode the DCI and may determine a temporal period associated with the indication of the set of TCI states. The UE may receive, based on the temporal period, the PDSCH according to one or more of the set of TCI states, the one or more receive beams associated with the set of TCI states, the PDSCH scheme, or one or more default receive beams. The communication device may, as a result, include features for improvements to power consumption, spectral efficiency, higher data rates and, in some examples, may promote enhanced efficiency for high reliability and low latency operations, among other benefits by supporting default QCL for single DCI-based multiple transmission reception points (TRPs).

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to power saving operations. In some examples, the described one or more communication devices may support high reliability and low latency communications, among other examples, in accordance with default QCL for single DCI-based multiple TRPs. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further illustrated by and described with reference to apparatus diagrams, system diagrams, and flowcharts that relate to default QCL for single DCI-based multiple TRPs.

Figure 1:
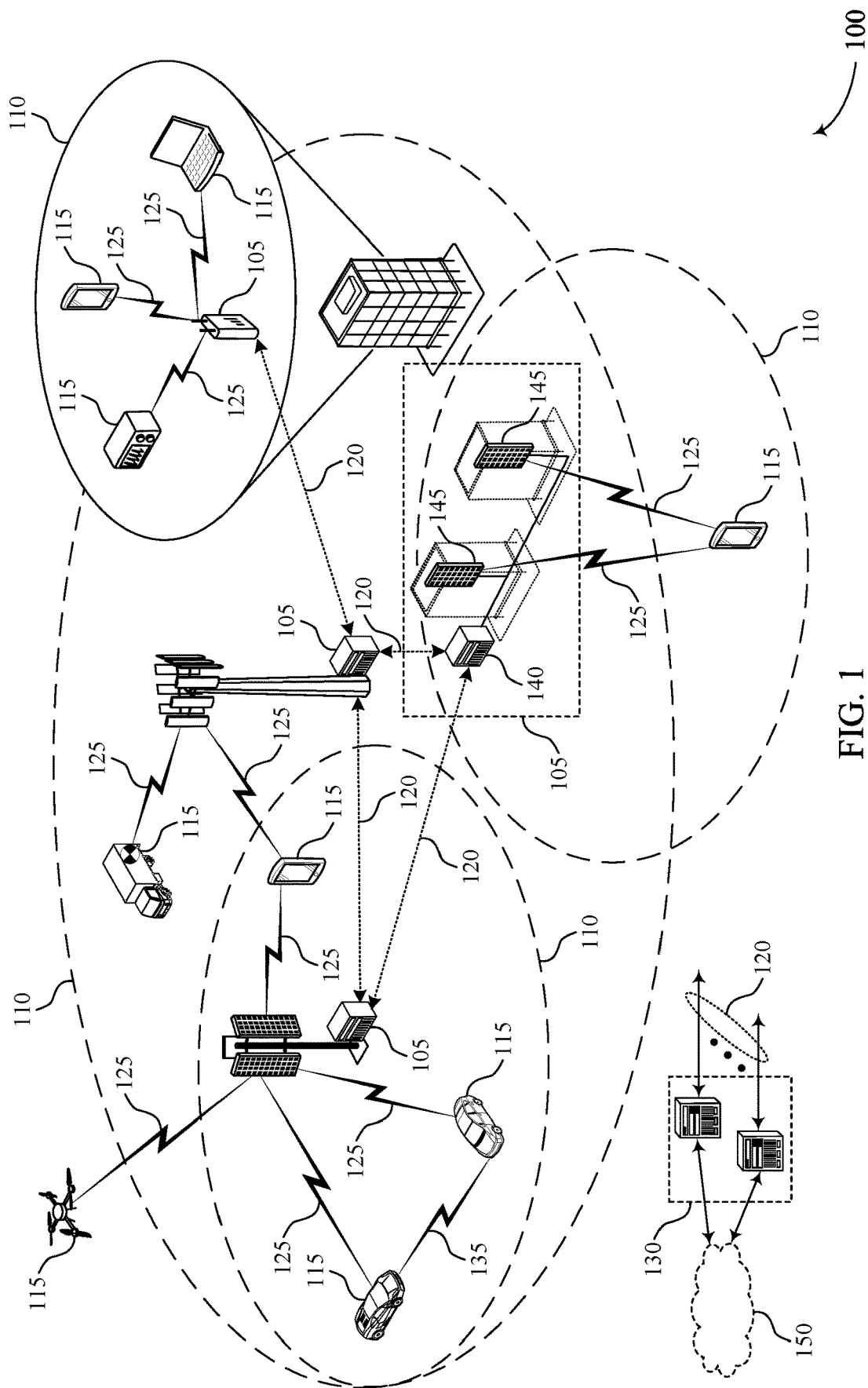
FIGS. 1 and 2 illustrate examples of a wireless communications system that supports default quasi-colocation (QCL) for single downlink control information (DCI)-based multiple transmission reception points (TRPs) in accordance with aspects of the present disclosure.

FIG. 1 illustrates an example of a wireless communications system 100 that supports default QCL for single DCI-based multiple TRPs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
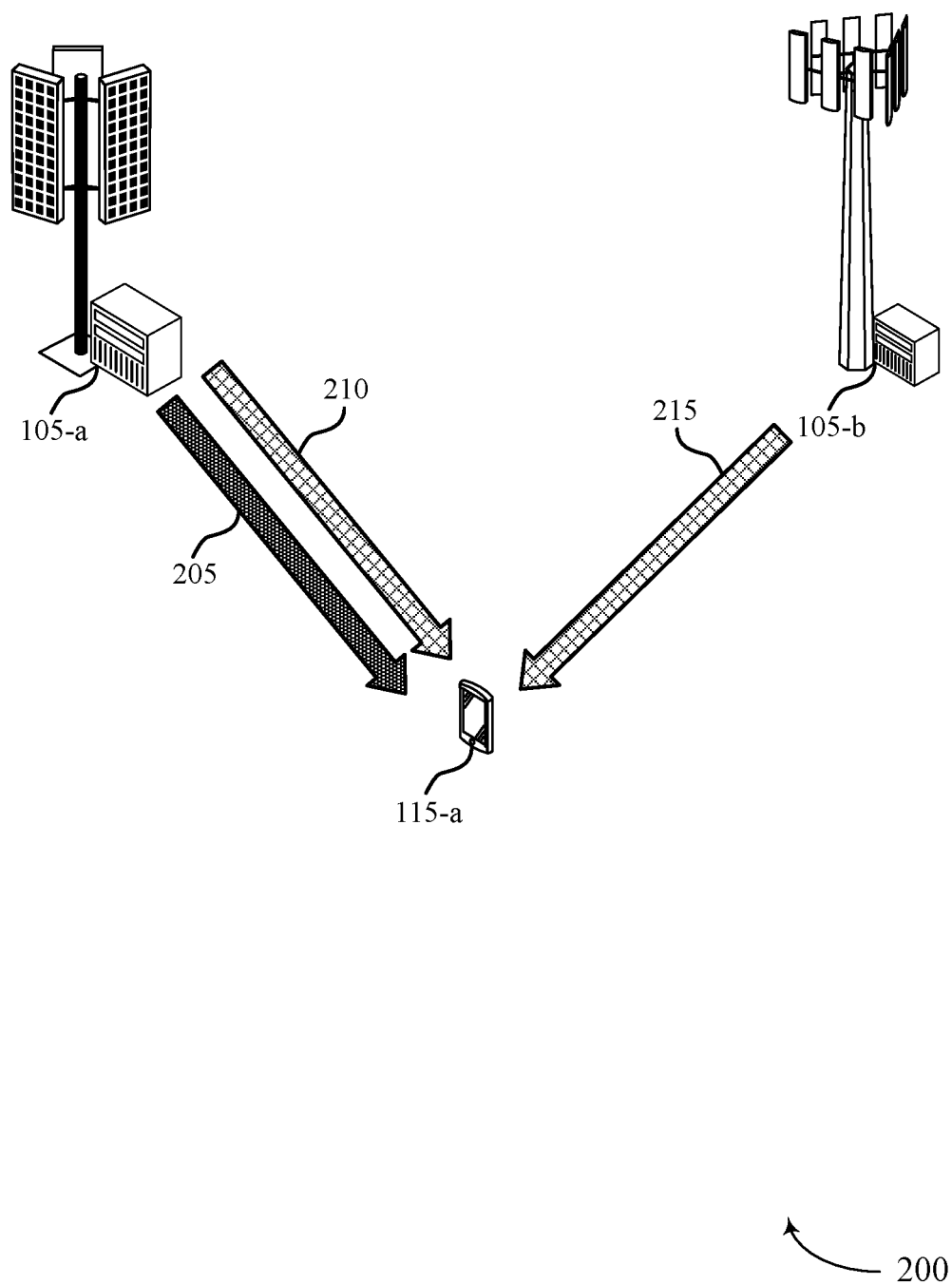

FIG. 2 illustrates an example of a wireless communications system 200 that supports default QCL for single DCI-based multiple TRPs in accordance with aspects of the present disclosure. In some examples, the wireless communications system 200 may implement aspects of the wireless communication system 100. For example, the wireless communications system 200 may support one or more radio access technologies including 4G systems such as LTE systems, LTE-A systems, or LTE-A Pro systems, and 5G systems which may be referred to as NR systems. The wireless communications system 200 may include a base station 105-a, a base station 105-b, and a UE 115-a, which may be examples of the corresponding devices described with reference to FIG. 1. In some examples, to be able to support higher data traffic in 5G systems and to enhance coverage, the wireless communications system 200 may be include multi-TRPs (e.g., macro-cells, small cells, pico-cells, femto-cells, remote radio heads, relay nodes, etc.). In the example of FIG. 2, one or more of the base station 105-a or the base station 105-b may be a TRP. The wireless communications system 200 may therefore support improvements to power consumption, spectral efficiency, higher data rates and, in some examples, may promote enhanced efficiency for wireless communication operations, among other benefits.

One or more of the base station 105-a, the base station 105-b, or the UE 115-b may be configured with multiple antennas, which may be used to employ techniques such as transmit diversity, receive diversity, MIMO communications, or beamforming. The antennas of one or more of the base station 105-a, the base station 105-b, or the UE 115-b may be located within one or more antenna arrays or antenna panels, which may support MIMO operations or transmit or receive beamforming. For example, one or more of the base station 105-a or the base station 105-b antennas or antenna arrays may be co-located at an antenna assembly, such as an antenna tower. In some examples, antennas or antenna arrays associated with one or more of the base station 105-a or the base station 105-b may be located in diverse geographic locations. One or more of the base station 105-a or the base station 105-b may have an antenna array with a number of rows and columns of antenna ports that the base station 105 may use to support beamforming of communications with the UE 115. Likewise, the UE 115 may have one or more antenna arrays that may support various MIMO or beamforming operations. Additionally or alternatively, an antenna panel may support radio frequency beamforming for a signal transmitted via one or more antenna ports.

One or more of the base station 105-a or the base station 105-b may support downlink transmission and the UE 115-a may support downlink reception. Likewise, the UE 115-a may support uplink transmission and one or more of the base station 105-a or the base station 105-b may support uplink reception. One or more of the base station 105-a or the base station 105-b may transmit, to the UE 115-a, data or control information via one or more physical downlink channels. For example, the base station 105-a may transmit control information (e.g., DCI) via a physical downlink channel, such as a PDCCH 205, and transmit data (e.g., user data, data samples, packets) via another physical downlink channel, such as a PDSCH 210. Likewise, the base station 105-b may transmit control information (e.g., DCI) via a physical downlink channel, such as a PDCCH, and/or transmit data (e.g., user data, data samples, packets) via a physical downlink channel, such as a PDSCH 215.

In some examples, one or more of the base station 105-a, the base station 105-b, or the UE 115-b may perform communication operations (e.g., downlink transmission, downlink reception, uplink transmission, uplink reception) according to one or more beams (also referred to as directional beams). In some examples, one or more antenna ports associated with one or more of the base station 105-a, the base station 105-b, or the UE 115-b may relate to one or more quasi-colocation (QCL) type parameters (also referred to QCL references). For example, one or more of the base station 105-a, the base station 105-b, or the UE 115-b may be configured to use different QCL references, such as a QCL TypeD reference that corresponds to different spatial receive beams (or antenna ports) for channel measurement, etc. A QCL reference may, in some examples, be a reference resource identifier, for example, such as a reference signal identifier, or the like. The reference resource identifier may be configured as a reference of a specific QCL parameter (e.g., a QCL Type A, a QCL Type B, a QCL Type C, a QCL Type D).

In some examples, one or more of the base station 105-a, the base station 105-b, or the UE 115-b may perform communication operations (e.g., downlink transmission, downlink reception, uplink transmission, uplink reception) according to one or more TCI states. One or more of the base station 105-a or the base station 105-b may dynamically transmit in a DCI an indication of one or more TCI states, or a set of TCI states. The TCI states may indicate a QCL-relationship between downlink reference signals and spatial receive beams (or antenna ports). In other words, each TCI state may include parameters for configuring a QCL relationship between one or two downlink reference signals, or more, and the antenna ports (e.g., associated with the PDSCH 210).

In some examples, one or more of the base station 105-*a*, the base station 105-*b*, or the UE 115-*a* may be configured to support using a single DCI for multi-TRP operations. For example, when supporting a single DCI for multi-TRP operations, one or more of the base station 105-*a* or the base station 105-*b* may each transmit, via a separate PDCCH, a DCI that schedules a separate PDSCH. In other words, a single PDCCH schedules a single PDSCH. One or more of the base station 105-*a*, the base station 105-*b*, or the UE 115-*a* may support various PDSCH schemes, such as spatial division multiplexing (SDM), frequency division multiplexing (FDM), or time division multiplexing (TDM) to enable one or more of the base station 105-*a*, the base station 105-*b*, or the UE 115-*a* to support the single DCI for multi-TRP operations. Examples of using a single DCI for multi-TRP operations are described with reference to FIGS. 3, 5, and 6.

Figure 3:
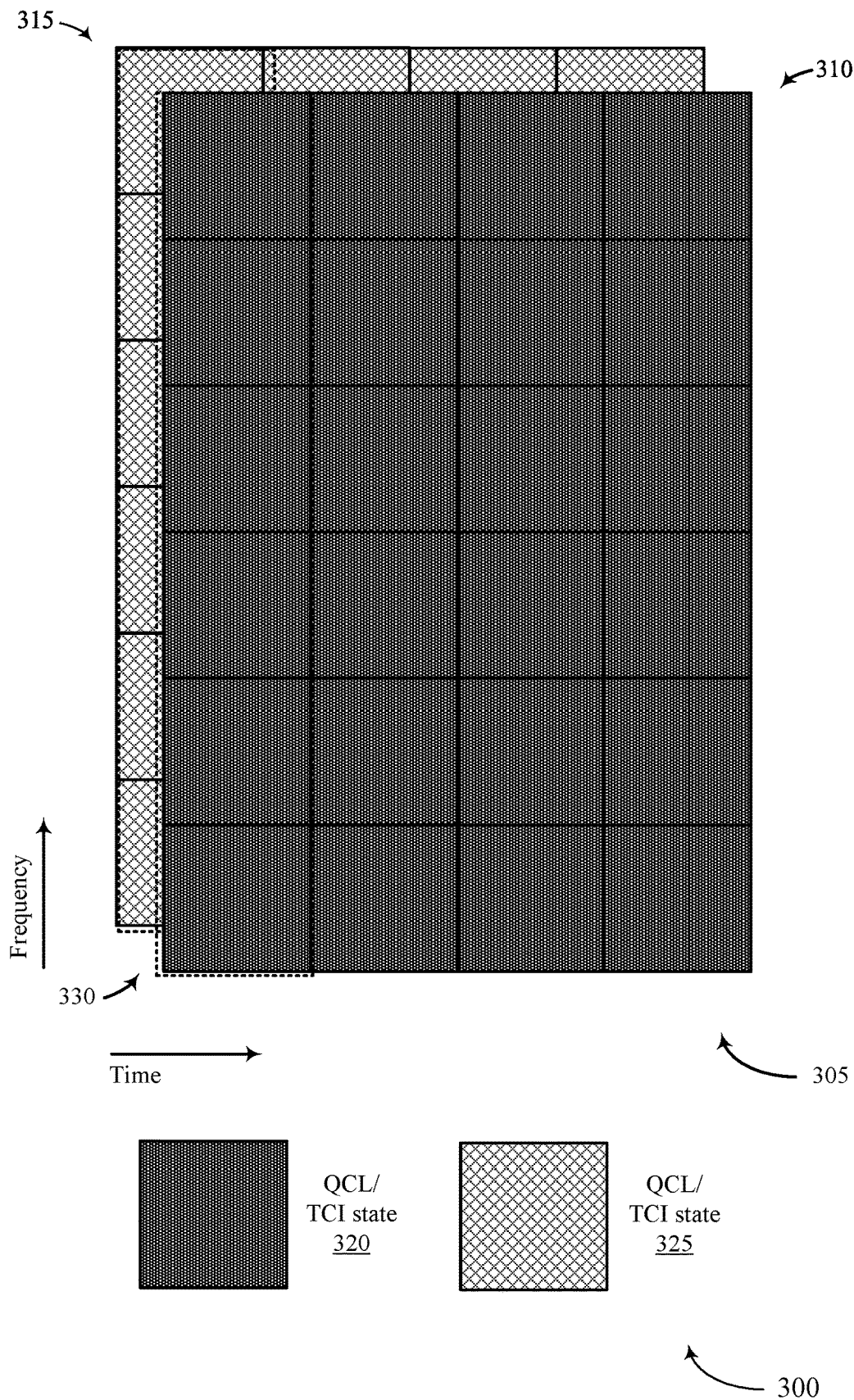
FIG. 3 illustrates an example of a scheme that supports default QCL for single DCI-based multiple TRPs in accordance with aspects of the present disclosure.

FIG. 3 illustrates an example of a scheme 300 that supports default QCL for single DCI-based multiple TRPs in accordance with aspects of the present disclosure. The scheme 300 may relate to a resource grid 305, which may be a function of time and frequency resources. In some examples, the time and frequency resources may relate to a resource element, which may span one symbol by one subcarrier. In some examples, multiple resource elements may be grouped into resource blocks, each of which may span a quantity of symbols by a quantity of subcarriers. For example, a resource block may span seven symbols (e.g., 0.5 ms) by 12 subcarriers (e.g., 180 kHz).

In accordance with the scheme 300, and with reference to FIG. 2, one or more of the base station 105-*a* or the base station 105-*b* may transmit different spatial layers using time and frequency resources of the resource grid 305. For example, the base station 105-*a* may transmit spatial layers using a quantity of resource blocks 310, and the base station 105-*b* may transmit spatial layers using a quantity of resource blocks 315. In some examples, one or more of the time and frequency resources of the resource grid 305 may overlap. For example, the quantity of resource blocks 310 related to transmitting spatial layers by the base station 105-*a* may overlap with the quantity of resource blocks 315 related to transmitting spatial layers by the base station 105-*b*. One or more of the base station 105-*a* or the base station 105-*b* may therefore support SDM. In other words, SDM may allow different TRPs (e.g., the base station 105-*a*, the base station 105-*b*) to transmit different spatial layers in overlapping time and/or frequency resources (e.g., resource blocks and/or symbols).

In some examples, different spatial layers associated with different TRPs may relate to different TCI states. For example, the base station 105-*a* may transmit spatial layers using the quantity of resource blocks 310 according to a first TCI state 320, and the base station 105-*b* may transmit spatial layers using the quantity of resource blocks 315 according to a second TCI state 325 different from the first TCI state 320. The first TCI state 320 may relate to a first QCL parameter (e.g., a first spatial receive beam), while the second TCI state 325 may relate to a second QCL parameter (e.g., a second spatial receive beam). The resource grid 305 may include a quantity of symbols relating to reference signals. For example, resource blocks 330 may include a quantity of symbols relating to reference signals, which may be demodulation reference signals (DMRS). In some examples, different TCI states may relate to different antenna ports. Examples of different TCI states relating to different antenna ports are described with reference to FIG. 4.

Figure 4:
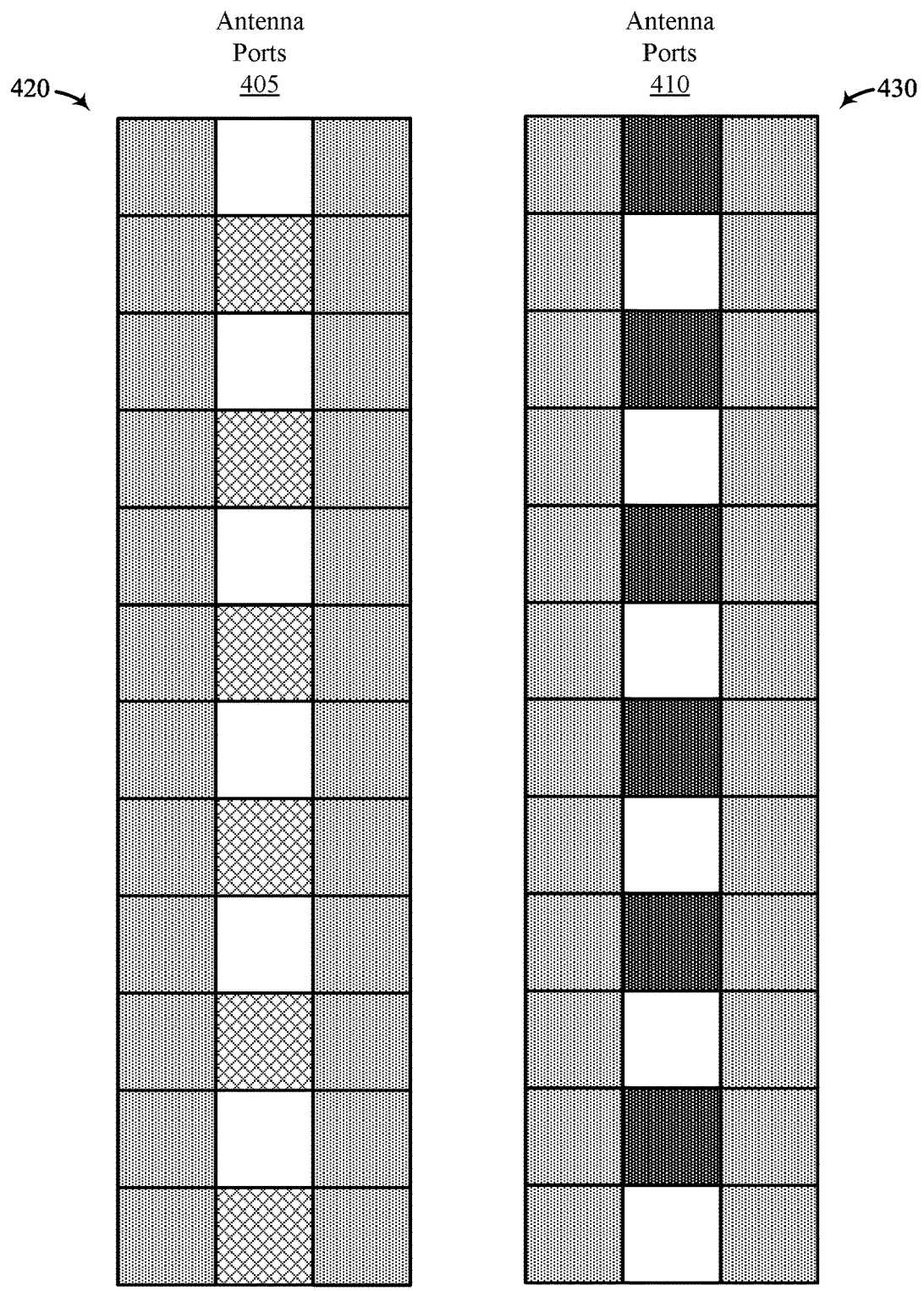
FIG. 4 illustrates an example of an antenna configuration that supports default QCL for single DCI-based multiple TRPs in accordance with aspects of the present disclosure.

FIG. 4 illustrates an example of an antenna port configuration 400 that supports default QCL for single DCI-based multiple TRPs in accordance with aspects of the present disclosure. The antenna port configuration 400 may include a quantity of antennas ports 405 and a quantity of antenna ports 410. In some examples, one or more of the quantity of antennas ports 405 and the quantity of antenna ports 410 may relate to a resource grid as described in FIG. 3. In the example of FIG. 3, the quantity of antennas ports 405 may include an antenna port 0 and an antenna port 1. The antenna port 0 may be used for single antenna transmission, while the antenna port 1 may be used for antenna transmit diversity and spatial multiplexing (e.g., using two or four antennas). The quantity of antennas ports 410 may include an antenna port 2 and an antenna port 3. The antenna port 2 and the antenna port 3 may be used for antenna transmit diversity and spatial multiplexing (e.g., using two or four antennas). In some examples, one or more of the antenna port 0, the antenna port 1, the antenna port 2, or the antenna port 3 may be referred to as a DMRS port because of being related to transmitting one or more DMRS.

In some examples, reference signal ports, such as DMRS ports corresponding to different TCI states may be in different code division multiplexing (CDM) groups. For example, DMRS ports corresponding to a TCI state 415 may be part of a CDM group 420, while DMRS ports corresponding to a TCI state 425 may be part of a CDM group 430. In the example of FIG. 3, two spatial layers (e.g., DMRS ports 0,1 part of the CDM group 420) may be transmitted, for example, with reference to FIG. 2, by one or more of the base station 105-*a* or the base station 105-*b* according to the TCI state 415. Likewise, two spatial layers (e.g., DMRS ports 2,3 part of the CDM group 430) may be transmitted, for example, with reference to FIG. 2, by one or more of the base station 105-*a* or the base station 105-*b* according to the TCI state 425.

Figure 5:
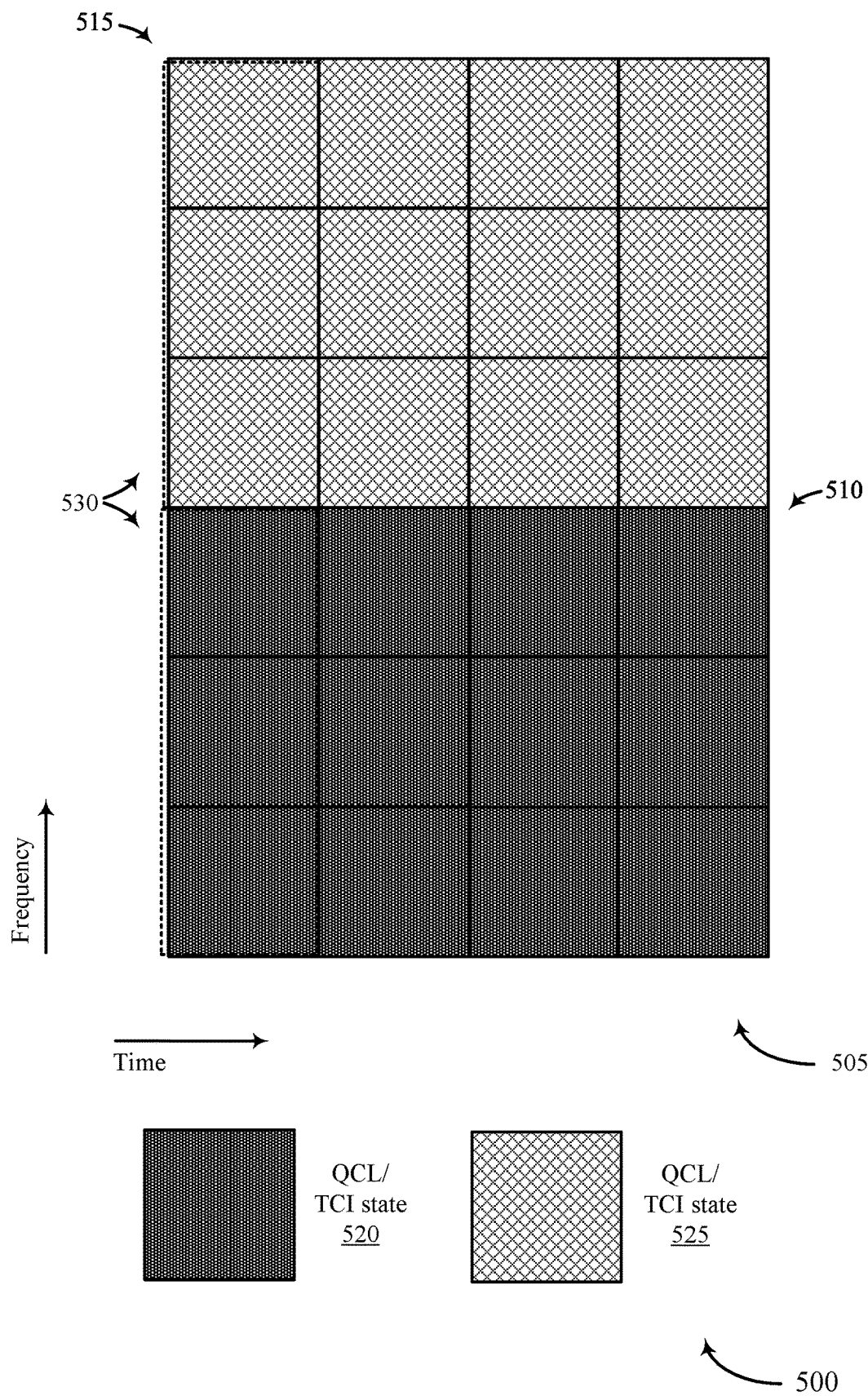
FIGS. 5 through 9 illustrate example of schemes that supports default QCL for single DCI-based multiple TRPs in accordance with aspects of the present disclosure.

FIG. 5 illustrates an example of a scheme 500 that supports default QCL for single DCI-based multiple TRPs in accordance with aspects of the present disclosure. The scheme 500 may relate to a resource grid 505, which may be a function of time and frequency resources. In some examples, the time and frequency resources may relate to a resource element, which may span one symbol by one subcarrier. In some examples, multiple resource elements may be grouped into resource blocks, each of which may span a quantity of symbols by a quantity of subcarriers. For example, a resource block may span seven symbols (e.g., 0.5 ms) by 12 subcarriers (e.g., 180 kHz).

In accordance with the scheme 500, and with reference to FIG. 2, one or more of the base station 105-*a* or the base station 105-*b* may transmit different spatial layers using time and frequency resources of the resource grid 505. For example, the base station 105-*a* may transmit spatial layers using a quantity of resource blocks 510, and the base station 105-*b* may transmit spatial layers using a quantity of resource blocks 515. The quantity of resource blocks 510 may be different from the quantity of resource blocks 515. For example, the quantity of resource blocks 510 and the quantity of resource blocks 515 may be non-overlapping in time and/or frequency resources. For example, one or more of the base station 105-*a* or the base station 105-*b* may support FDM. In some examples, one or more of the base station 105-*a* or the base station 105-*b* may transmit different spatial layers using FDM. Thus, FDM allows different TRPs (e.g., the base station 105-a, the base station 105-b) to transmit different spatial layers in different frequency resources (e.g., resource blocks).

In some examples, different spatial layers associated with different TRPs may relate to different TCI states. For example, the base station 105-a may transmit spatial layers using the quantity of resource blocks 510 according to a first TCI state 520, and the base station 105-b may transmit spatial layers using the quantity of resource blocks 515 according to a second TCI state 525 different from the first TCI state 520. The first TCI state 520 may relate to a first QCL parameter (e.g., a first spatial receive beam), while the second TCI state 525 may relate to a second QCL parameter (e.g., a second spatial receive beam). Thus, different set of resource blocks may be transmitted with different TCI states. The resource grid 505 may also include a quantity of symbols relating to reference signals. For example, resource blocks 530 may include a quantity of symbols relating to reference signals, which may be DMRS.

Figure 6:
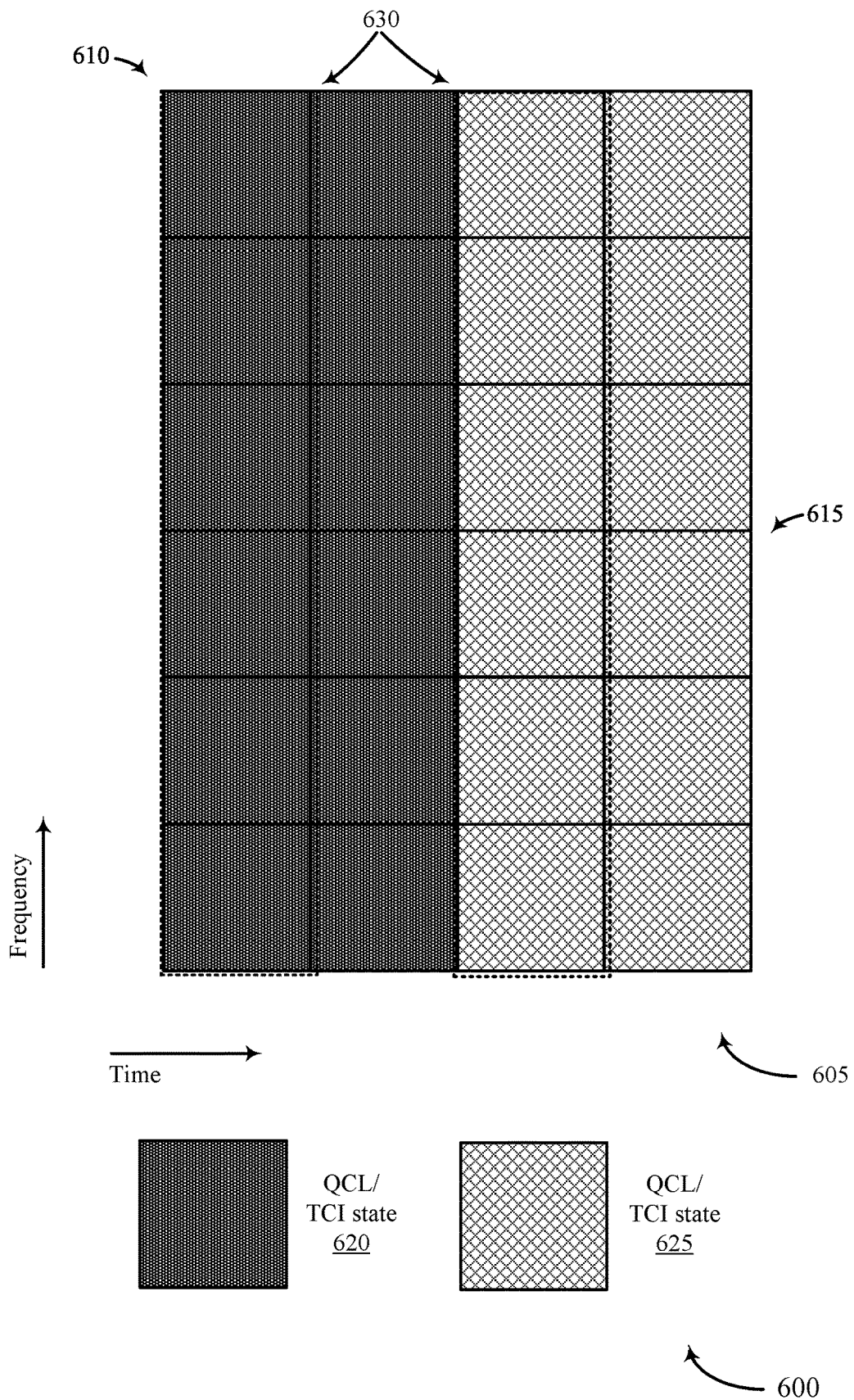

FIG. 6 illustrates an example of a scheme 600 that supports default QCL for single DCI-based multiple TRPs in accordance with aspects of the present disclosure. The scheme 600 may relate to a resource grid 605, which may be a function of time and frequency resources. In some examples, the time and frequency resources may relate to a resource element, which may span one symbol by one subcarrier. In some examples, multiple resource elements may be grouped into resource blocks, each of which may span a quantity of symbols by a quantity of subcarriers. For example, a resource block may span seven symbols (e.g., 0.5 ms) by 12 subcarriers (e.g., 180 kHz).

In accordance with the scheme 600, and with reference to FIG. 2, one or more of the base station 105-a or the base station 105-b may transmit different spatial layers using time and frequency resources of the resource grid 605. For example, the base station 105-a may transmit spatial layers using a quantity of resource blocks 610, and the base station 105-b may transmit spatial layers using a quantity of resource blocks 615. The quantity of resource blocks 610 may be different from the quantity of resource blocks 515. For example, the quantity of resource blocks 610 and the quantity of resource blocks 615 may be non-overlapping in time and/or frequency resources. For example, one or more of the base station 105-a or the base station 105-b may support TDM. In some examples, one or more of the base station 105-a or the base station 105-b may transmit different spatial layers using TDM. Thus, TDM allows different TRPs (e.g., the base station 105-a, the base station 105-b) to transmit different spatial layers in different time resources (e.g., different mini-slots, slots, etc.). In some examples, TDM allows different TRPs (e.g., the base station 105-a, the base station 105-b) to transmit different spatial layers with different repetitions within a same slot, or in different slots.

In some examples, different spatial layers associated with different TRPs may relate to different TCI states. For example, the base station 105-a may transmit spatial layers using the quantity of resource blocks 610 according to a first TCI state 620, and the base station 105-b may transmit spatial layers using the quantity of resource blocks 615 according to a second TCI state 625 different from the first TCI state 620. The first TCI state 520 may relate to a first QCL parameter (e.g., a first spatial receive beam), while the second TCI state 625 may relate to a second QCL parameter (e.g., a second spatial receive beam). Thus, different set of resource blocks may be transmitted with different TCI states. The resource grid 605 may also include a quantity of symbols relating to reference signals. For example, resource blocks 630 may include a quantity of symbols relating to reference signals, which may be DMRS.

Returning to FIG. 2, in some examples, when one or more of the base station 105-a or the base station 105-b support using a single DCI for multi-TRP operations, a TCI field in a DCI may indicate multiple TCI states. For example, when one or more of the base station 105-a or the base station 105-b use a single-DCI to schedule a multi-TCI state transmission, a TCI field in a DCI may indicate two TCI states, so that the UE 115-a may receive the scheduled PDSCH (e.g., the PDSCH 210, the PDSCH 215). In some examples, one or more of the base station 105-a or the base station 105-b may be configured to support a QCL indication related to reference signals (e.g., one or more DMRS) for a PDSCH via DCI signaling. A TCI field in the DCI signaling may thus point to two QCL relationships referring to two reference signals sets. In some examples, each TCI code point in a DCI may correspond to one or two TCI states.

In some examples, one or more of the base station 105-a, the base station 105-b, or the UE 115 may support dynamic switching between multi-TCI states (i.e., multi-TRP) and single-TCI state transmission. For example, the UE 115-a may be configured to determine to function in accordance with a single-TRP operation when a TCI field in a DCI points to one TCI state. Alternatively, the UE 115-a may be configured to determine to function in accordance with a multi-TRP when a TCI field in a DCI points to more than one TCI state (e.g., two TCI states). Therefore, one or more of the base station 105-a, the base station 105-b, or the UE 115-a may support dynamic switching between different multi-TCI state schemes (e.g., SDM, FDM, TDM) based on an indication in DCI signaling.

One or more of the the base station 105-a, the base station 105-b, or the UE 115-a may be configured to support a default QCL determination. In some examples, one or more of the the base station 105-a, the base station 105-b, or the UE 115-a may be configured to support a default QCL for multi-TRP schemes including how to define more than one default QCLs (i.e., for SDM and FDM schemes two beams are received simultaneously at two different antenna panels of the UE 115-a).

DCI signaling may relate to one or more DCI formats. In some examples, the UE 115-a may determine a presence or an absence of a TCI state indication for a PDSCH (e.g., the PDSCH 210, the PDSCH 215) in the DCI signaling. In some examples, in a first DCI format (e.g., a DCI format 1_0) there may be no TCI field. In some other examples, in a second DCI format (e.g., a DCI format 1_1), the UE 115-a may determine a presence of a TCI state indication based on a higher layer parameter. For example, the UE 115-a may determine a presence of a TCI state indication when a higher layer parameter (e.g., a tci-PresentInDCI parameter) is enabled for a CORESET scheduling a PDSCH. The TCI state indication may be a one-bit or multi-bit indication in the DCI signaling.

In some examples, the UE 115-a may determine a temporal offset period that may relate to a timing offset between the UE 115-a receiving a downlink DCI and a corresponding PDSCH (e.g., the PDSCH 210, the PDSCH 215). The UE 115-a may determine that the temporal offset period is equal to or greater than a threshold period (e.g., a timeDuration-ForQCL). In some examples, the threshold period may be based on a UE capability (e.g., a subcarrier spacing (e.g., candidate values for 120 kHz SCS: {14,28} symbols). In some examples, if a higher layer parameter (e.g., tci-PresentInDCI) is enabled in a DCI, and when a PDSCH is scheduled by a first DCI format (e.g., the DCI format 1_1), the UE 115 may use an indicated TCI state in a TCI field of the DCI for QCL assumption of the PDSCH. Alternatively, if the higher layer parameter (e.g., tci-PresentInDCI) is not configured for a CORESET scheduling the PDSCH or the PDSCH is scheduled by a second DCI format (e.g., the DCI format 1_0), the UE 115 may be configured to use a TCI state or a beam (e.g., a QCL assumption) for the PDSCH, which may be identical to a QCL assumption for the CORESET used for the PDCCH transmission. A QCL assumption may also be referred to as a receive beam. That is, QCL assumptions may relate to different receive beams for the UE 115-a.

In some examples, the UE 115-a may determine that the temporal offset period between receiving a downlink DCI and a corresponding PDSCH (e.g., the PDSCH 210, the PDSCH 215) is less than the threshold period (e.g., time-DurationForQCL). The UE 115-a may therefore be configured to use a default TCI state. For example, the UE 115-a may be configured to use a same QCL as a PDCCH QCL indication of the CORESET associated with a monitored search space with a lowest CORESET identifier in a latest slot in which one or more CORESETs within an active bandwidth of a serving cell (e.g., the base station 105-a, the base station 105-b) are monitored by the UE 115-a. In other examples, the UE 115-a may determine that none of configured TCI states for the serving cell associated with a scheduled PDSCH include a QCL reference type (e.g., a QCL-TypeD). As such, the UE 115 may obtain other QCL assumptions from the indicated TCI states for its scheduled PDSCH irrespective of the time offset between the reception of the downlink DCI and the corresponding PDSCH.

In some examples, the threshold period (e.g., timeDurationForQCL) may include a first period to decode the DCI (and hence obtaining scheduling information including TCI field) plus a second period to configure and switch receive beams (e.g., for QCL-TypeD) based on the indicated TCI state in the TCI field of the DCI. A default QCL may allow for buffering received samples with a predetermined receive beam (e.g., which may change in different slots but be known to the UE 115-a apriori based on synchronization signal set and/or a CORESET configuration) in case that a scheduling offset is less than the threshold (which will be known after decoding the DCI, i.e., K0/Start and Length Indicator Value (SLIV) indicated by time domain resource allocation (TDRA) field).

One or more of the base station 105-a or the base station 105-b may be configured to include in a DCI an indication of a single TCI state (e.g., single TRP), a first PDSCH scheme (e.g., an SDM), a second PDSCH scheme (e.g., an FDM), a third PDSCH scheme (e.g., a TDM within a slot), or a fourth PDSCH scheme (e.g., a TDM across slots). In some examples, one or more of the base station 105-a or the base station 105-b may be configured to include in a DCI a TCI field, which may indicate one or more TCI states. In some examples, one or of the base station 105-a or the base station 105-b may be configured to configure the UE 115-a within one or more of the single TCI state (e.g., single TRP), the first PDSCH scheme (e.g., an SDM), the second PDSCH scheme (e.g., an FDM), the third PDSCH scheme (e.g., a TDM within a slot), or the fourth PDSCH scheme (e.g., a TDM across slots) via RRC signaling, and the UE 115-a may use one of the above example scheme based on the DCI indication. In addition, the U 115-a may be configured to have two default QCL assumptions for receiving two beams simultaneously (for SDM and/or FDM). In an example, the UE 115-a may be configured with two default QCL assumptions (e.g., two default receive beams). In some examples, the UE 115-a may be configured with two default QCL assumptions (e.g., two default receive beams) in each symbol, mini-slot, slot, etc.

By way of example, the UE 115-a may be configured to receive a DCI on the PDCCH 205. The DCI may include one or more of an indication of a set of TCI states related to a PDSCH (e.g., the PDSCH 210, the PDSCH 215), one or more receive beams associated with the set of TCI states, or a PDSCH scheme. The UE 115-a may determine a temporal period (e.g., T1) to decode the DCI, and receive, based on the temporal period, the PDSCH according to one or more of the set of TCI states, the one or more receive beams associated with the set of TCI states, the PDSCH scheme, one or more default receive beams, or a default PDSCH scheme. In some examples, the UE 115-a may identify a TCI field in the DCI, where the TCI field indicates one or more TCI states of the set of TCIs states.

The UE 115-a may identify a capability relating to the one or more receive beams, and select one or more of the set of TCI states, the one or more receive beams associated with the set of TCI states, the PDSCH scheme, the one or more default receive beams, or the default PDSCH scheme based on the capability. The UE 115-a may include an indication of the temporal period in the capability, and transmit the capability carrying the indication of the temporal period, for example, to the base station 105-a and/or the base station 105-b.

In some examples, the UE 115-a may determine a second temporal period (e.g., T2) related to the one or more receive beams, and transmit, with the capability, a second indication of the second temporal period related to the one or more receive beams. In some examples, the temporal period (e.g., T1) may be different from the second temporal period (e.g., T2). The second temporal period (e.g., T2) may relate to one or more of a quantity of symbols to receive the PDCCH 205, and apply spatial QCL information for the PDSCH 210. In some examples, the quantity of symbols may be an OFDM symbols. The UE 115-a may, in some examples, determine a subcarrier spacing based on a capability, and the temporal period may be based on the subcarrier spacing. The UE 115-a may, in some examples, determine a quantity of symbols to receive the PDCCH 205 based on the second temporal period, apply spatial QCL information for the PDSCH 210, and receive the PDSCH 210 based on the spatial QCL information.

In some examples, the UE 115-a may determine that a temporal offset period is greater than or equal to the second temporal period. The temporal offset period may be a duration from an ending symbol of the PDCCH 205 carrying the DCI to a beginning symbol of the PDSCH 210, where the PDCCH 205 schedules the PDSCH 210. As such, the UE 115-a may receive, based on the temporal offset period being greater than or equal to the second temporal period, the PDSCH 210 according to one or more of the one or more TCI states of the set of TCIs states or the PDSCH scheme. In other words, the UE 115-a may use the indicated PDSCH scheme and the indicated TCI state(s) for the PDSCH 210 reception.

In some other examples, the UE 115-a may determine that the temporal offset period is greater than or equal to the temporal period, and determine that the temporal offset period is lesser than or equal to the second temporal period. As such, the UE 115-a may receive the PDSCH 210, based on one or more of the temporal offset period being greater than or equal to the temporal period or the temporal offset period being lesser than or equal to the second temporal period, the PDSCH 210 according to one or more of the set of TCI states, the one or more receive beams associated with the set of TCI states, or one or more default receive beams for the PDSCH. In other words, the UE 115-a may use the indicated PDSCH scheme, but a default QCL assumption(s) for the PDSCH 210 reception. The default QCL assumption(s) may be independent of the information in the DCI or can be determined based the PDSCH scheme and other parameters in the DCI (e.g., location of transmission occasions for a TDM scheme).

The UE 115-a may, in other examples, determine that a temporal offset period is lesser than the temporal period, and may receive the PDSCH 210, based on the temporal offset period being lesser than the temporal period, the PDSCH 210 according to one or more of the one or more default receive beams or the default PDSCH scheme for the PDSCH. That is, the UE 115-a may use a default PDSCH scheme and default QCL assumption(s) (e.g., default receive beam) for the PDSCH 210 reception. In some examples, a default PDSCH scheme may be a function of a subset of PDSCH schemes that the UE 115-a is configured with (e.g., possible schemes that can be indicated by DCI) or can be a fixed scheme (e.g., SDM, FDM, TDM, or single-TCI state).

In some examples, the UE 115-a may determine that a temporal offset period is lesser than the second temporal period, and receiving, based on that the temporal offset period being lesser than the second temporal period, a first data sample set in accordance with a first default receive beam of the one or more default receive beams, and receive, based on that the temporal offset period being lesser than the second temporal period, a second data sample set in accordance with a second default receive beam of the one or more default receive beams. The UE 115-a may store one or more of the first data sample set or the second data sample set based on that the temporal offset period being lesser than the second temporal period. The stored first data sample set or the stored second data sample set correspond to a first antenna panel or a second antenna panel. In other words, when a scheduling offset is less than the threshold period (e.g., a timeDurationForQCL), the UE 115-a may store two sets of samples on two antenna panels using two corresponding default QCL assumptions (e.g., using two sets of spatial receive beam parameters). In some examples, there is no default scheme (i.e., default scheme may be needed exclusively, if we have T1). Also, the actual (indicated PDSCH scheme) may not be needed for storing the data sample sets. It is used (after decoding the DCI) for processing the data sample sets and decoding the PDSCH.

In some examples, the UE 115-a may use both set of data samples for SDM. For example, the UE 115-a may process one or more of the first data sample set or the second data sample set based on the PDSCH scheme, where the PDSCH scheme is an SDM scheme. In some other examples, the UE 115-a may, for FDM, use one set of data samples in a first set of resource blocks (corresponding to a first TCI state) and second set of samples in a second set of resource blocks (corresponding to a second TCI state). For example, the UE 115-a may process one or more of the first data sample set or the second data sample set based on the PDSCH scheme, where the PDSCH scheme is an FDM scheme. Thus, the UE 115-a may process one or more of the first data sample set or the second data sample set by processing the first data sample set in a first set of resource blocks corresponding to a first TCI state of the TCI states, and processing the second data sample set in a second set of resource blocks corresponding to a second TCI state of the TCI states.

In other examples, the UE 115-a may, for TDM, use one set of samples in a first set of symbols, slots, or transmission occasions (corresponding to a first TCI state) and a second set of samples in a second set of symbols, slots, or transmission occasions (corresponding to a second TCI state. For example, the UE 115-a may process one or more of the first data sample set or the second data sample set based on the PDSCH scheme, where the PDSCH scheme is a TDM scheme. The UE 115-a may therefore process one or more of the first data sample set or the second data sample set by processing the first data sample set in a first set of TTIs corresponding to a first TCI state of the TCI states, and processing the second data sample set in a second set of set of TTIs corresponding to a second TCI state of the TCI states.

In some examples, the UE 115-a may use the first data sample set for a single-TCI state (e.g., if the TCI field indicates one TCI state). The TCI state(s) indicated by a TCI field in a DCI might have different QCL(s) than the default QCL assumptions. The UE 115-a may thus be configured to use a single antenna panel (and hence one of the data samples based on a default QCL in a transmission occasion) for TDM or single TCI-state schemes. However, if the UE 115-a knows the PDSCH scheme (for example knows that it is single-TCI or knows that it is TDM and the two or more transmissions occasions (repetitions)), then even if the scheduling offset is less than the threshold period (e.g., a timeDurationForQCL) and the UE 115-a has to use a default QCL, the UE 115-a may use both antenna panels for reception per transmission occasion.

In some examples, during a PDSCH duration, as an ongoing transmission crosses one or more thresholds (e.g., time boundaries, such as a symbol, a mini-slot, or a slot), a default PDSCH scheme or a default QCL assumption (e.g., a default receive beam) may be changed to the indicated ones. Examples of changing TCI states across one or more timing boundaries are described with reference to FIG. 7.

Figure 7:
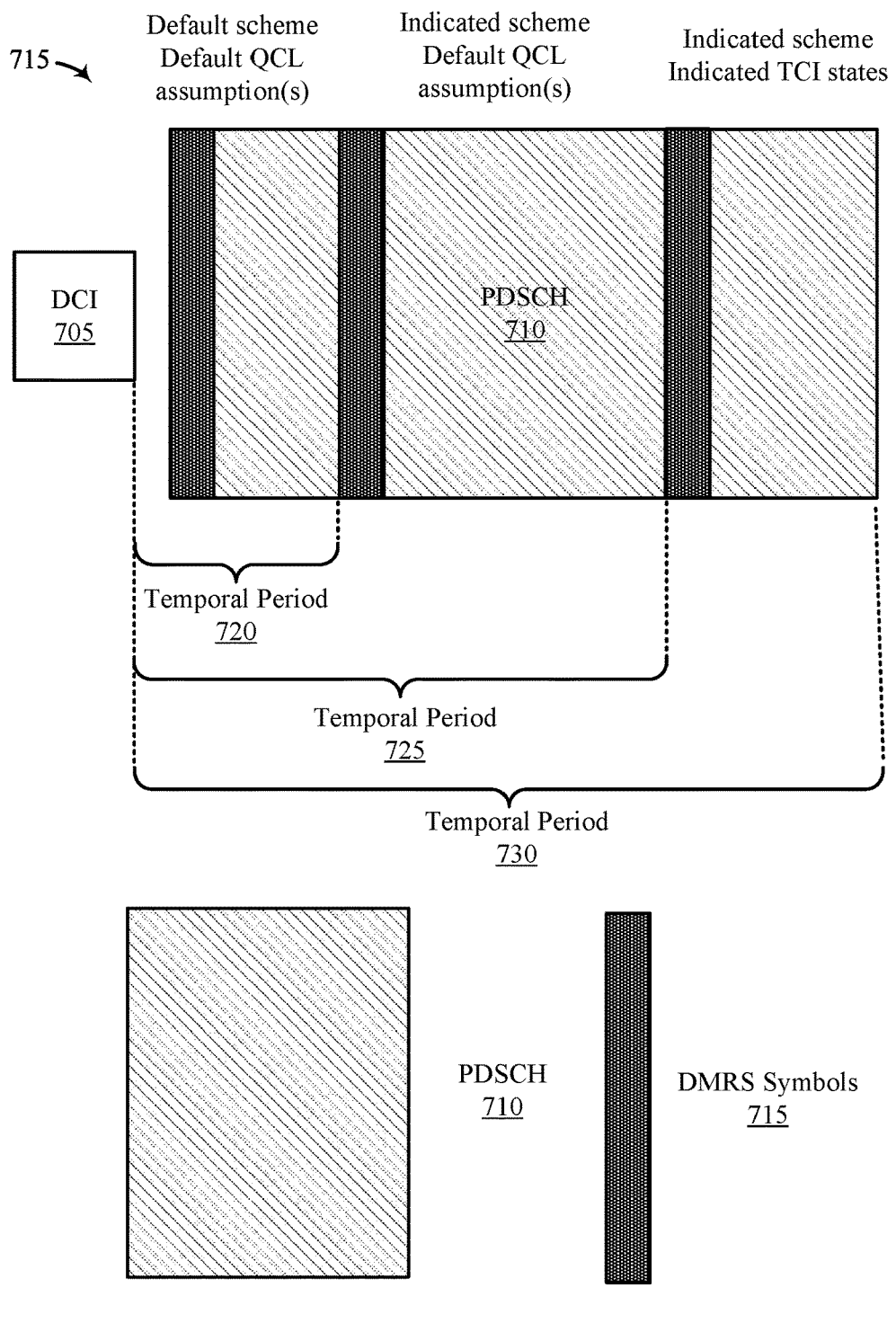

FIG. 7 illustrates an example of a scheme 700 that supports default QCL for single DCI-based multiple TRPs in accordance with aspects of the present disclosure. The scheme 700 may implement aspects of the wireless communications system 200 described with reference to FIG. 2, respectively. For example, the scheme 700 may be based on a configuration by one or more of the base station 105-a, the base station 105-b, or the UE 115-a, and implemented by one or more of the base station 105-a, the base station 105-b, or the UE 115-a, for reduced power consumption, and may promote low latency for wireless communications. With reference to FIG. 2, one or more of the base station 105-a or the base station 105-b may transmit control information and/or data to the UE 115-a. For example, one or more of the base station 105-a or the base station 105-b may transmit DCI 705 to the UE 115-a. The control information may schedule a PDSCH associated with one or more of the base station 105-a or the base station 105-b. For example, the DCI 705 may schedule a PDSCH 710, or one or more PDSCHs. The PDSCH 710 may correspond to one or more DMRS symbols 715.

In the example of FIG. 7, and with reference to FIG. 2, the UE 115-a may be configured to receive the PDSCH 710 over a duration. The duration may include a transmission occasion, a TTI. The TTI may include one or more symbols, one or more mini-slots, one or more slots, or a combination thereof. In some examples, the UE 115-a may operate, during a first portion (e.g., temporal period 720) of a duration, according to one or more of the set of TCI states, the one or more receive beams associated with the set of TCI states, the PDSCH scheme, one or more default receive beams, or the default PDSCH scheme. In other words, the UE 115-a may be configured to use a single-TCI state (default scheme) with a default QCL assumption during the first portion of the PDSCH 710.

In some examples, the UE 115-a may operate, during a second portion (e.g., temporal period 725) of the duration, according to one or more of the set of TCI states, the one or more receive beams associated with the set of TCI states, the PDSCH scheme, one or more default receive beams, or the default PDSCH scheme. In other words, the UE 115-a may be configured to use an SDM scheme (indicated), for example, with two default QCL assumptions during the second portion. In some examples, the UE 115-a may operate, during a third portion (e.g., temporal period 730) of the duration according to one or more of the set of TCI states, the one or more receive beams associated with the set of TCI states, the PDSCH scheme, one or more default receive beams, or the default PDSCH scheme. In other words, the UE 115-a may be configured to use an SDM scheme according to two indicated TCI states during the third portion.

In some examples, from the first portion (e.g., temporal period 720) to the second portion (e.g., temporal period 725), if the default scheme and/or QCL assumption(s) in the first portion are different than the actual ones used in the second portion, the UE 115-a may assume that the DMRS symbols 715 present in a first symbol of the second portion. That is, the UE 115-a may determine a location of a DMRS, so that UE 115-a can obtain channel estimation. For example, the UE 115-a may perform, during the first portion, a channel measurement estimation related to one or more of the PDCCH or the PDSCH based on one or more of the set of TCI states, the one or more receive beams associated with the set of TCI states, the PDSCH scheme, one or more default receive beams, or the default PDSCH scheme.

Additionally or alternatively, the UE 115-a may perform, during the second portion, a channel measurement estimation related to one or more of the PDCCH or the PDSCH based on one or more of the set of TCI states, the one or more receive beams associated with the set of TCI states, the PDSCH scheme, one or more default receive beams, or the default PDSCH scheme. The UE 115-a may determine a difference between the first portion and the second portion based on the one or more of the set of TCI states, the one or more receive beams associated with the set of TCI states, the PDSCH scheme, one or more default receive beams, or the default PDSCH scheme, and determine a reference signal location (e.g., DMRS) in the second portion of the duration based on the difference. In some examples, the reference signal location includes a beginning symbol of the second portion of the duration. In some examples, the reference signal location in the second portion of the duration may be based on a length of one or more of a PDCCH (e.g., carrying the DCI 705) or the PDSCH 710.

Returning to FIG. 2, in some examples, the UE 115-a may be configured to determine one or more default QCL assumptions. Examples of multiple default QCL assumptions are described with reference to FIG. 8.

Figure 8:
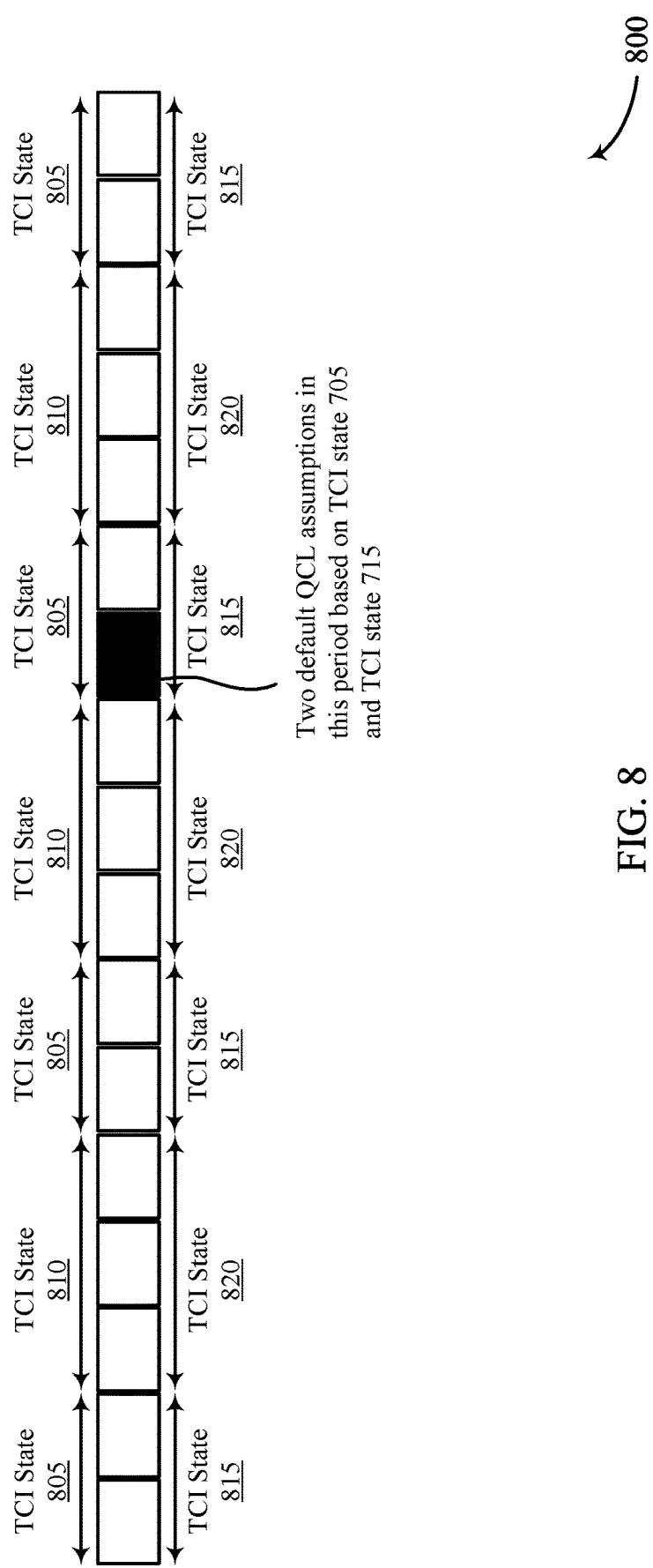

FIG. 8 illustrates an example of a scheme 800 that supports default QCL for single DCI-based multiple TRPs in accordance with aspects of the present disclosure. The scheme 800 may implement aspects of the wireless communications system 200 described with reference to FIG. 2, respectively. For example, the scheme 800 may be based on a configuration by one or more of the base station 105-a, the base station 105-b, or the UE 115-a, and implemented by one or more of the base station 105-a, the base station 105-b, or the UE 115-a, for reduced power consumption, and may promote low latency for wireless communications.

With reference to FIG. 2, the UE 115-a may be configured to identify, based on a CORESET identifier, a first default receive beam of a set of default receive beams. The UE 115-a may receive an indication of a second default receive beam of the set of default receive beams, and determine the second default receive beam based on the indication. The UE 115-a may therefore, receive one or more data samples for PDSCHs jointly over the first default receive beam and the second default receive beam. The CORESET identifier may be a lowest CORESET identifier in an ending symbol or an ending slot associated with a transmission occasion. In some examples, the UE 115-a may monitor one or more CORESETs within an active bandwidth part associated with a serving cell (e.g., the base station 105-a, the base station 105-b). The CORESET identifier is a lowest CORESET identifier in a latest symbol or a latest slot that a CORESET is monitored within the active bandwidth part associated with the serving cell. The first default receive beam of the set of default receive beams may be different from the second default receive beam of the set of default receive beams over one or more periods.

In some examples, the UE 115-a may receive, for example, from one or more of the base station 105-a or the base station 105-b a first control signaling, an additional indication of the first default receive beam of the set of default receive beams, where the first control signaling includes a first MAC-CE signaling. Additionally or alternatively, the UE 115-a may receive, for example, from one or more of the base station 105-a or the base station 105-b in a second control signaling, the indication of the second default receive beam of the set of default receive beams, where the second control signaling includes a second MAC-CE signaling. Alternatively, the UE 115-a may receive, for example, from one or more of the base station 105-a or the base station 105-b, in a single control signaling, one or more of the indication of the second default receive beam of the set of default receive beams or the additional indication of the first default receive beam of the set of default receive beams. Thus, the first default beam may be based on a rule, and the second default beam may be based on the beam pairs (that is indicated by RRC or MAC-CE) that has the first TCI state (associated with the first default receive beam) as one of the values in the pair. In other words, the second default beam is not based on a second control resource set identifier. Instead, it is based on the first default beam (based on the first control resource set identifier) as well as the list of beam pairs.

In some examples, the control signaling may include a TCI states pattern indicating one or more TCI states related to one or more periods. For example, the control signaling may indicate TCI states 805, TCI states 810, TCI states 815, and/or TCI states 820. The TCI states pattern may correspond to one or more of a periodicity associated with TCI states (e.g., TCI states 805, TCI states 810, TCI states 815, and/or TCI states 820), a duration associated with the TCI states (e.g., TCI states 805, TCI states 810, TCI states 815, and/or TCI states 820), or a temporal offset period associated with the TCI states (e.g., TCI states 805, TCI states 810, TCI states 815, and/or TCI states 820). The one or more periods may relate to one or more TTIs including one or more symbols, one or more mini-slots, one or more slots, or a combination thereof.

Thus, a first default QCL may be based on a lowest CORESET identifier in a latest slot, in which one or more CORESETs within an active bandwidth part of a serving cell (e.g., the base station 105-a, the base station 105-b) are monitored by the UE 115-a), while the second default QCL is indicated by a MAC-CE. Alternatively, both the first and the second default QCL assumptions may be indicated by the MAC-CE.

Figure 9:
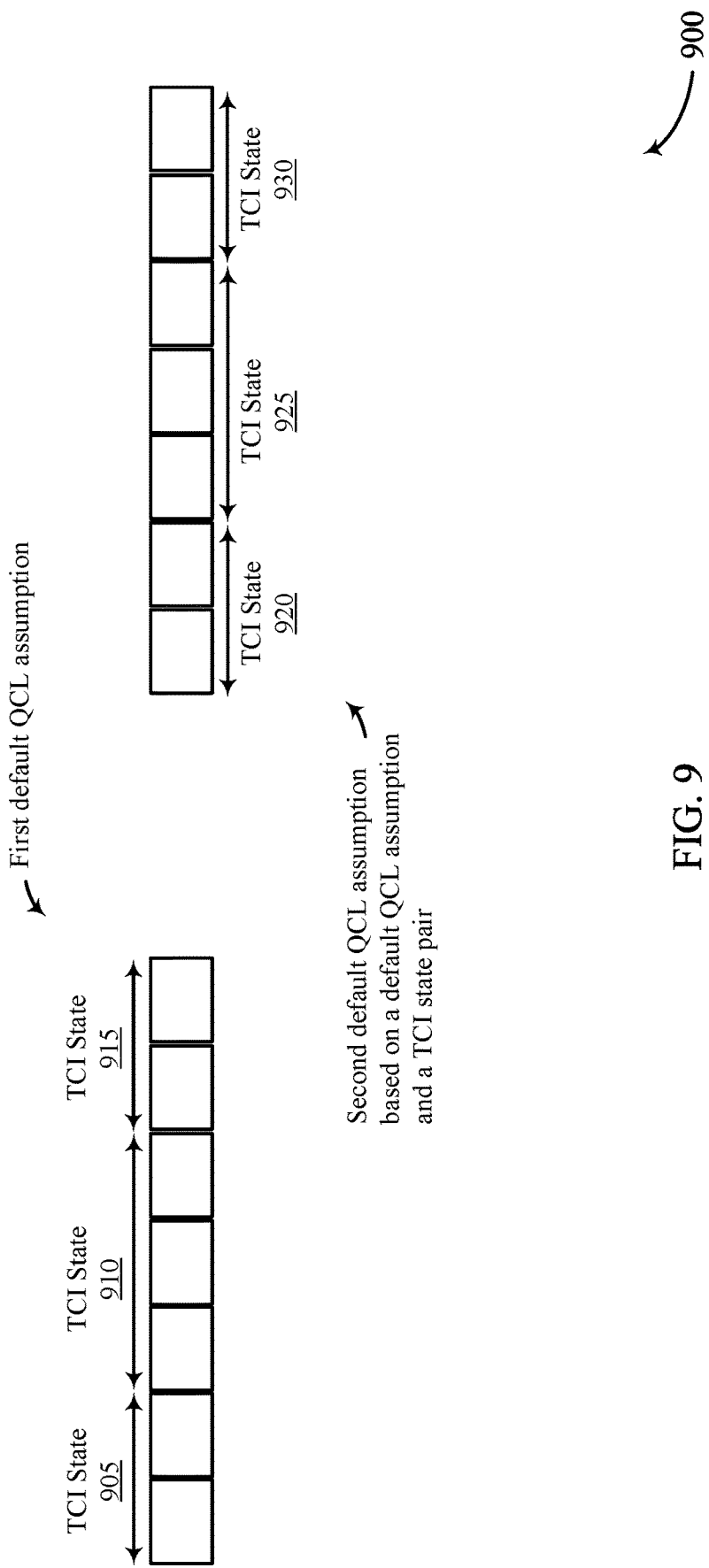

FIG. 9 illustrates an example of a scheme 900 that supports default QCL for single DCI-based multiple TRPs in accordance with aspects of the present disclosure. The scheme 900 may implement aspects of the wireless communications system 200 described with reference to FIG. 2, respectively. For example, the scheme 900 may be based on a configuration by one or more of the base station 105-a, the base station 105-b, or the UE 115-a, and implemented by one or more of the base station 105-a, the base station 105-b, or the UE 115-a, for reduced power consumption, and may promote low latency for wireless communications.

With reference to FIG. 2, the UE 115-a may be configured to identify, based on a first CORESET set identifier, a first default receive beam of a set of default receive beams, and determine, based on a second CORESET identifier, a second default receive beam of the set of default receive beams. The UE 115-a may, as a result, receive, one or more data samples for PDSCHs jointly over the first default receive beam and the second default receive beam. The first CORESET identifier may be a first lowest CORESET identifier in an ending symbol or an ending slot associated with a transmission occasion. The second CORESET identifier may be a second lowest CORESET identifier in the ending symbol or the ending slot associated with the transmission occasion. Thus, the first CORESET identifier may be different from the second CORESET identifier.

The first CORESET identifier may correspond to a first TCI state. Likewise, the second CORESET identifier may correspond to a second TCI state different from the first TCI state. In some examples, the UE 115-a may be configured to receive control signaling including an indication of a pair of default receive beams corresponding to a TCI state pair. The set of default receive beams may include the pair of default receive beams. The control signaling may include RRC signaling and/or MAC-CE signaling. The UE 115-a may determine the second default receive beam of the set of default receive beams based on a first TCI state (e.g., TCI state 905, TCI state 910, TCI state 915) associated with the first default receive beam that is paired with a second TCI state (e.g., TCI state 920, TCI state 925, TCI state 930) associated with the second default receive beam.

Thus, a first default QCL may be determined based on a lowest CORESET identifier in a latest slot, in which one or more CORESETs within an active bandwidth part of a serving cell are monitored by the UE 115-a. The second default QCL assumption may be based on a second lowest CORESET identifier that is different from the first CORESET identifier, and has a different TCI state) in a latest slot that is monitored by the UE 115-a. A set of beam pairs (e.g., TCI state pairs) may also be configured for the UE 115-a (e.g., via RRC signaling) or indicated by MAC-CE signaling (e.g., two beams in the pair can be received simultaneously). The first default QCL assumption may be different in different slots (e.g., based on CORESET, synchronization signal set configuration). The second default QCL assumption may be determined based on a TCI state that is paired with the TCI state determined for the first default QCL assumption (e.g., TCI state pairs given by {(TCI state 905, TCI state 920), (TCI state 910, TCI state 925), (TCI state 915, TCI state 930)}.

Figure 10:
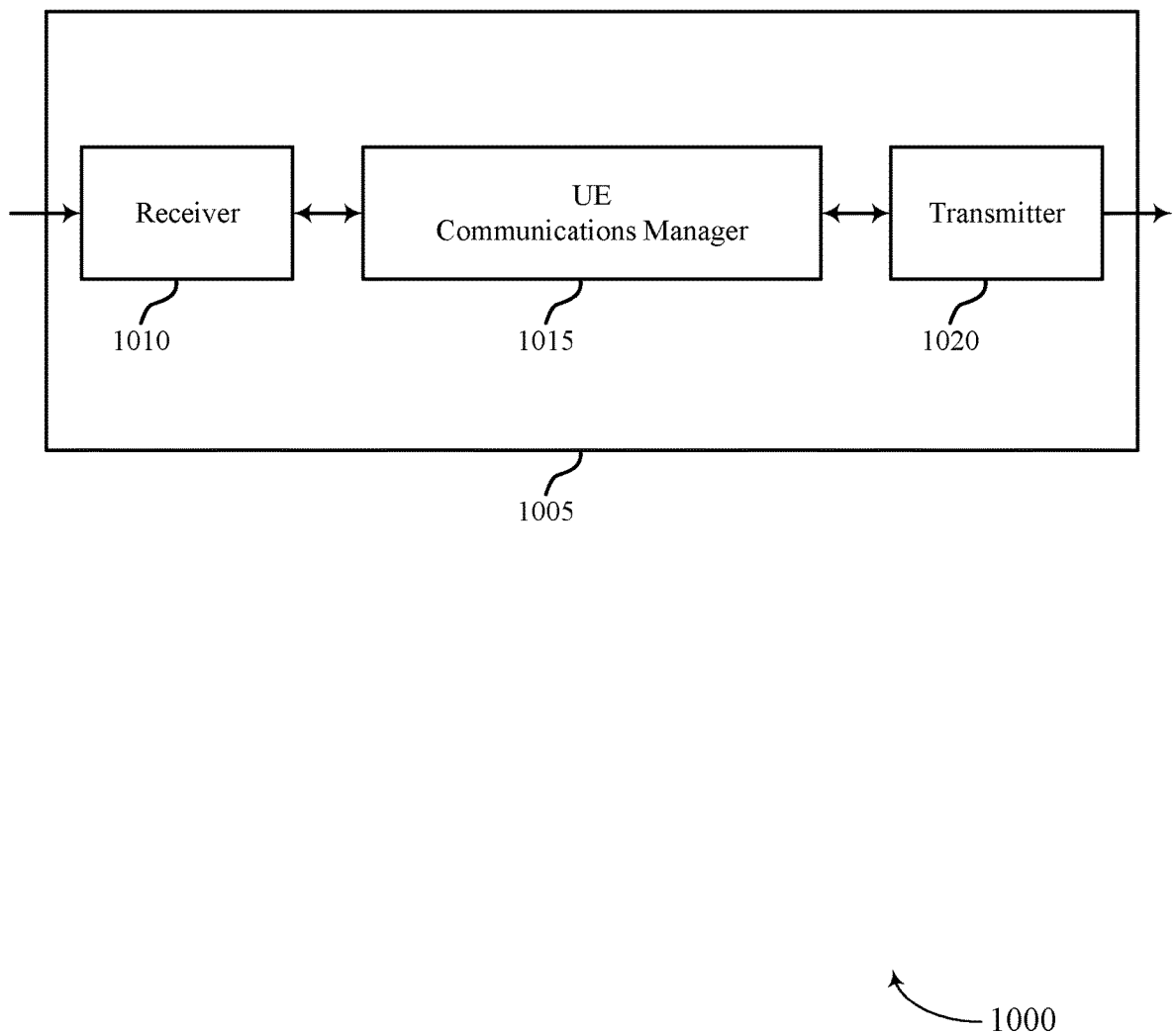
FIGS. 10 and 11 show block diagrams of devices that support default QCL for single DCI-based multiple TRPs in accordance with aspects of the present disclosure.

FIG. 10 shows a block diagram 1000 of a device 1005 that supports default QCL for single DCI-based multiple TRPs in accordance with aspects of the present disclosure. The device 1005 may be an example of aspects of a UE 115 as described herein. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to default QCL for single DCI-based multiple TRPs, etc.). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may receive a DCI on a PDCCH, the DCI including one or more of an indication of a set of TCI states related to a PDSCH, one or more receive beams associated with the set of TCI states, or a PDSCH scheme, decode the DCI, determine a temporal period associated with the indication of the set of TCI states, and receive, based on the temporal period, the PDSCH according to one or more of the set of TCI states, the one or more receive beams associated with the set of TCI states, the PDSCH scheme, or one or more default receive beams. The UE communications manager 1015 may also identify, based on a CORESET identifier, a first default receive beam of a set of default receive beams, receive an indication of a second default receive beam of the set of default receive beams, determine the second default receive beam based on the indication, and receive one or more data samples for PDSCHs jointly over the first default receive beam and the second default receive beam. The UE communications manager 1015 may also identify, based on a first CORESET identifier, a first default receive beam of a set of default receive beams, determine, based on a second CORESET identifier, a second default receive beam of the set of default receive beams, and receive one or more data samples for PDSCHs jointly over the first default receive beam and the second default receive beam. The UE communications manager 1015 may be an example of aspects of the UE communications manager 1310 described herein.

The UE communications manager 1015 may be implemented as an integrated circuit or chipset for the device 1005, and the receiver 1010 and the transmitter 1020 may be implemented as analog components (for example, amplifiers, filters, antennas) coupled with the device 1005 modem to enable wireless transmission and reception The actions performed by the UE communications manager 1015 as described herein may be implemented to realize one or more potential advantages. At least one implementation may enable the UE communications manager 1015 to receive a PDSCH based on a temporal period associated with a set of TCI states. Based on implementing the receiving, one or more processors of the device 1005 (for example, processor(s) controlling or incorporated with the UE communications manager 1015) may promote improvements to power savings and, in some examples, may promote spectral efficiency, higher data rates, and enhanced efficiency for high reliability and low latency operations, among other benefits.

The UE communications manager 1015, or its sub-components, may be implemented in hardware, code (e.g., software or firmware) executed by a processor, or any combination thereof. If implemented in code executed by a processor, the functions of the UE communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
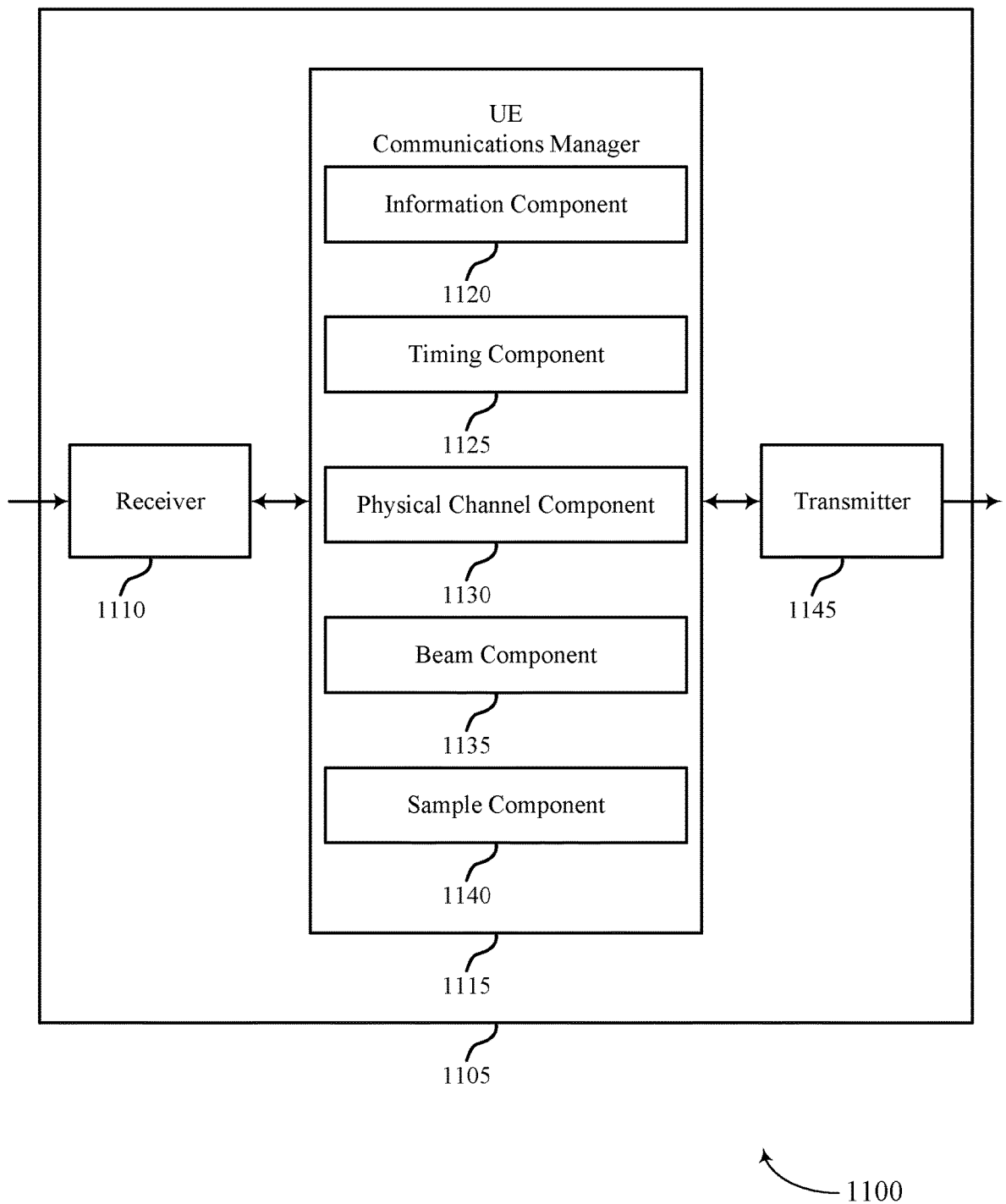

FIG. 11 shows a block diagram 1100 of a device 1105 that supports default QCL for single DCI-based multiple TRPs in accordance with aspects of the present disclosure. The device 1105 may be an example of aspects of a device 1005, or a UE 115 as described herein. The device 1105 may include a receiver 1110, a UE communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to default QCL for single DCI-based multiple TRPs, etc.). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include an information component 1120, a timing component 1125, a physical channel component 1130, a beam component 1135, and a sample component 1140. The UE communications manager 1115 may be an example of aspects of the UE communications manager 1310 described herein.

The information component 1120 may receive a DCI on a PDCCH, the DCI including one or more of an indication of a set of TCI states related to a PDSCH, one or more receive beams associated with the set of TCI states, or a PDSCH scheme. The information component 1120 may decode the DCI. The timing component 1125 may determine a temporal period to decode the DCI. The physical channel component 1130 may receive, based on the temporal period, the PDSCH according to one or more of the set of TCI states, the one or more receive beams associated with the set of TCI states, the PDSCH scheme, or one or more default receive beams.

The beam component 1135 may identify, based on a CORESET identifier, a first default receive beam of a set of default receive beams, receive an indication of a second default receive beam of the set of default receive beams, and determine the second default receive beam based on the indication. The sample component 1140 may receive one or more data samples for PDSCHs jointly over the first default receive beam and the second default receive beam. The beam component 1135 may identify, based on a first CORESET identifier, a first default receive beam of a set of default receive beams, determine, based on a second CORESET identifier, a second default receive beam of the set of default receive beams, and receive one or more data samples for PDSCHs jointly over the first default receive beam and the second default receive beam.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
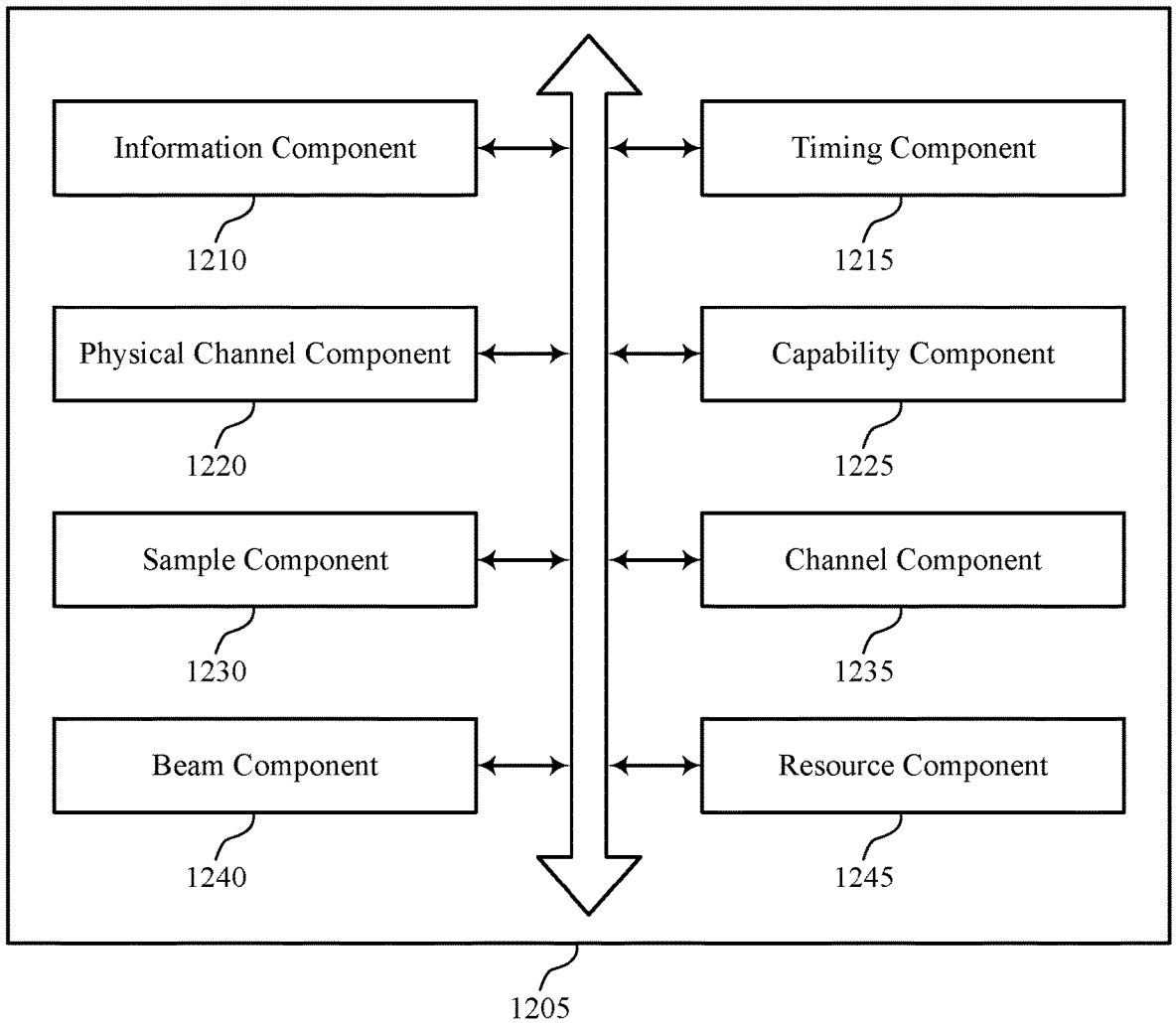
FIG. 12 shows a block diagram of a communications manager that supports default QCL for single DCI-based multiple TRPs in accordance with aspects of the present disclosure.

FIG. 12 shows a block diagram 1200 of a UE communications manager 1205 that supports default QCL for single DCI-based multiple TRPs in accordance with aspects of the present disclosure. The UE communications manager 1205 may be an example of aspects of a UE communications manager 1015, a UE communications manager 1115, or a UE communications manager 1310 described herein. The UE communications manager 1205 may include an information component 1210, a timing component 1215, a physical channel component 1220, a capability component 1225, a sample component 1230, a channel component 1235, a beam component 1240, and a resource component 1245. Each of these modules may communicate, directly or indirectly, with one another (e.g., via one or more buses).

The information component 1210 may receive a DCI on a PDCCH, the DCI including one or more of an indication of a set of TCI states related to a PDSCH, one or more receive beams associated with the set of TCI states, or a PDSCH scheme. The information component 1210 may decode the DCI. In some examples, the information component 1210 may apply spatial QCL information for the PDSCH. In some examples, the information component 1210 may identify a TCI field in the DCI, where the TCI field indicates one or more TCI states of the set of TCI states. In some cases, the DCI may include an indication of a default PDSCH scheme, and the default PDSCH scheme may be based on a set of preconfigured PDSCH schemes.

The timing component 1215 may determine a temporal period associated with the indication of the set of TCI states. In some cases, the timing component 1215 may determine a second temporal period to decode the DCI. In some examples, the timing component 1215 may determine a quantity of symbols to receive the PDCCH based on the temporal period. In some examples, the timing component 1215 may determine that a temporal offset period is greater than or equal to the temporal period, and receive, based on the temporal offset period being greater than or equal to the temporal period, the PDSCH according to one or more of the one or more TCI states of the set of TCI states or the PDSCH scheme.

In some examples, the timing component 1215 may determine that the temporal offset period is greater than or equal to the second temporal period. In some examples, the timing component 1215 may determine that the temporal offset period is lesser than or equal to the temporal period, and receive, based on one or more of the temporal offset period being greater than or equal to the second temporal period or the temporal offset period being lesser than or equal to the temporal period, the PDSCH according to one or more of the PDSCH scheme, the set of TCI states, the one or more receive beams associated with the set of TCI states, or one or more default receive beams for the PDSCH. In some examples, the timing component 1215 may determine that a temporal offset period is lesser than the second temporal period, and receive, based on the temporal offset period being lesser than the second temporal period, the PDSCH according to one or more of the one or more default receive beams or the default PDSCH scheme for the PDSCH.

In some examples, the timing component 1215 may determine that a temporal offset period is lesser than the temporal period. In some examples, the timing component 1215 may determine a subcarrier spacing based on a capability, where determining the second temporal period is based on the subcarrier spacing. In some cases, the temporal offset period includes a duration from an ending symbol of the PDCCH carrying the DCI to a beginning symbol of the PDSCH, where the PDCCH schedules the PDSCH. In some cases, the temporal period includes a quantity of symbols.

The physical channel component 1220 may receive, based on the temporal period, the PDSCH according to one or more of the set of TCI states, the one or more receive beams associated with the set of TCI states, the PDSCH scheme, or one or more default receive beams. In some examples, the physical channel component 1220 may receive the PDSCH based on the spatial QCL information. In some examples, physical channel component 1220 may receive the PDSCH over a duration, where the duration includes a transmission occasion, a TTI, and the TTI including one or more OFDM symbols, one or more mini-slots, one or more slots, or a combination thereof. In some cases, the default receive beam may be based on a set of preconfigured receive beams (e.g., not indicated in the DCI). In some cases, the PDSCH scheme or the default PDSCH scheme includes a TDM scheme, an FDM scheme, an SDM scheme, or a CDM scheme.

The sample component 1230 may receive one or more data samples for PDSCHs jointly over the first receive beam and the second receive beam. In some examples, the sample component 1230 may receive, based on that the temporal offset period being lesser than the temporal period, a first data sample set in accordance with a first default receive beam of the one or more default receive beams. In some examples, the sample component 1230 may receive, based on that the temporal offset period being lesser than the temporal period, a second data sample set in accordance with a second default receive beam of the one or more default receive beams.

In some examples, the sample component 1230 may store one or more of the first data sample set or the second data sample set based on that the temporal offset period being lesser than the temporal period, where the stored first data sample set or the stored second data sample set correspond to a first antenna panel or a second antenna panel. In some examples, the sample component 1230 may process one or more of the first data sample set or the second data sample set based on the PDSCH scheme, where the PDSCH scheme includes an SDM scheme. In some examples, the sample component 1230 may process one or more of the first data sample set or the second data sample set based on the set of TCI states. In some examples, the sample component 1230 may process one or more of the first data sample set or the second data sample set based on the PDSCH scheme, where the PDSCH scheme includes an FDM scheme. In some examples, the sample component 1230 may process the first data sample set in a first set of resource blocks corresponding to a first TCI state of the TCI states. In some examples, the sample component 1230 may process the second data sample set in a second set of resource blocks corresponding to a second TCI state of the TCI states.

In some examples, sample component 1230 may process one or more of the first data sample set or the second data sample set based on the PDSCH scheme, where the PDSCH scheme includes a TDM scheme. In some examples, the sample component 1230 may process the first data sample set in a first set of TTIs corresponding to a first TCI state of the TCI states. In some examples, the sample component 1230 may process the second data sample set in a second set of set of TTIs corresponding to a second TCI state of the TCI states.

The beam component 1240 may identify, based on a CORESET identifier, a first default receive beam of a set of default receive beams. In some examples, the beam component 1240 may receive an indication of a second default receive beam of the set of default receive beams. In some examples, the beam component 1240 may determine the second default receive beam based on the indication. In some examples, the beam component 1240 may identify, based on a first CORESET identifier, a first default receive beam of a set of default receive beams. In some examples, the beam component 1240 may determine, based on a second CORESET identifier, a second default receive beam of the set of default receive beams. In some examples, the beam component 1240 may receive one or more data samples for PDSCHs jointly over the first default receive beam and the second default receive beam.

In some examples, receiving, in a first control signaling, an additional indication of the first default receive beam of the set of default receive beams, where the first control signaling includes a first MAC-CE signaling. In some examples, receiving, in a second control signaling, the indication of the second default receive beam of the set of default receive beams, where the second control signaling includes a second MAC-CE signaling. In some examples, receiving, in a control signaling, one or more of the indication of the second default receive beam of the set of default receive beams or the additional indication of the first default receive beam of the set of default receive beams, where the control signaling includes a MAC-CE signaling. In some examples, the beam component 1240 may receive control signaling including an indication of a pair of default receive beams corresponding to a TCI state pair, where the set of default receive beams includes the pair of default receive beams.

In some examples, the beam component 1240 may determine the second default receive beam of the set of default receive beams based on a first TCI state associated with the first default receive beam that is paired with a second TCI state associated with the second default receive beam. In some cases, the CORESET identifier is a lowest CORESET identifier in a latest symbol or a latest slot that a CORESET is monitored within an active bandwidth part associated with a serving cell. In some cases, the control signaling includes a TCI states pattern indicating one or more TCI states related to one or more periods. In some cases, the TCI states pattern corresponds to one or more of a periodicity associated with TCI states, a duration associated with the TCI states, or a temporal offset period associated with the TCI states. In some cases, the first default receive beam of the set of default receive beams is different from the second default receive beam of the set of default receive beams over one or more periods. In some cases, the one or more periods relate to one or more TTIs including one or more symbols, one or more mini-slots, one or more slots, or a combination thereof.

In some cases, the first CORESET identifier is a first lowest CORESET identifier in an ending symbol or an ending slot associated with a transmission occasion. In some cases, the second CORESET identifier is a second lowest CORESET identifier in the ending symbol or the ending slot associated with the transmission occasion. In some cases, the first CORESET identifier is different from the second CORESET identifier. In some cases, the first CORESET identifier corresponds to a first TCI state. In some cases, the second CORESET identifier corresponds to a second TCI state different from the first TCI state. In some cases, the control signaling includes RRC signaling. In some cases, the control signaling includes MAC-CE signaling.

The capability component 1225 may identify a capability relating to the one or more receive beams. In some examples, the capability component 1225 may select one or more of the set of TCI states, the one or more receive beams associated with the set of TCI states, the PDSCH scheme, one or more default receive beams, or a default PDSCH scheme based on the capability, where receiving the PDSCH is based on the selecting. In some examples, the capability component 1225 may include an indication of the temporal period in the capability. In some examples, the capability component 1225 may transmit the capability carrying the indication of the temporal period. In some examples, the capability component 1225 may transmit, with the capability, a second indication of the second temporal period related to decode the DCI.

In some examples, the capability component 1225 may operate, during a first portion of a duration, according to one or more of the set of TCI states, the one or more receive beams associated with the set of TCI states, the PDSCH scheme, one or more default receive beams, or the default PDSCH scheme. In some examples, the capability component 1225 may operate, during a second portion of the duration, according to one or more of the set of TCI states, the one or more receive beams associated with the set of TCI states, the PDSCH scheme, one or more default receive beams, or the default PDSCH scheme. In some cases, the temporal period is different from the second temporal period. In some cases, the second temporal period is smaller than the temporal period. In some cases, the second temporal period relates to one or more of a quantity of symbols to receive the PDCCH, and apply spatial QCL information for the PDSCH.

The channel component 1235 may perform, during the first portion, a channel measurement estimation related to one or more of the PDCCH or the PDSCH based on one or more of the set of TCI states, the one or more receive beams associated with the set of TCI states, the PDSCH scheme, one or more default receive beams, or the default PDSCH scheme. In some examples, the channel component 1235 may perform, during the second portion, a channel measurement estimation related to one or more of the PDCCH or the PDSCH based on one or more of the set of TCI states, the one or more receive beams associated with the set of TCI states, the PDSCH scheme, one or more default receive beams, or the default PDSCH scheme. In some examples, the channel component 1235 may determine a difference between the first portion and the second portion based on the one or more of the set of TCI states, the one or more receive beams associated with the set of TCI states, the PDSCH scheme, one or more default receive beams, or the default PDSCH scheme. In some examples, the channel component 1235 may determine a reference signal location in the second portion of the duration based on the difference.

In some examples, the channel component 1235 may determine the reference signal location in the second portion of the duration is further based on a length of one or more of the PDCCH or the PDSCH. In some examples, the channel component 1235 may determine the reference signal location in the second portion of the duration is further based on the second temporal period to decode the DCI. In some cases, the reference signal location includes a DMRS location. In some cases, the reference signal location includes a beginning symbol of the second portion of the duration. The resource component 1245 may monitor one or more CORESETs within an active bandwidth part associated with a serving cell, where the CORESET identifier is a lowest CORESET identifier in a latest symbol or a latest slot that a CORESET is monitored within the active bandwidth part associated with the serving cell.

Figure 13:
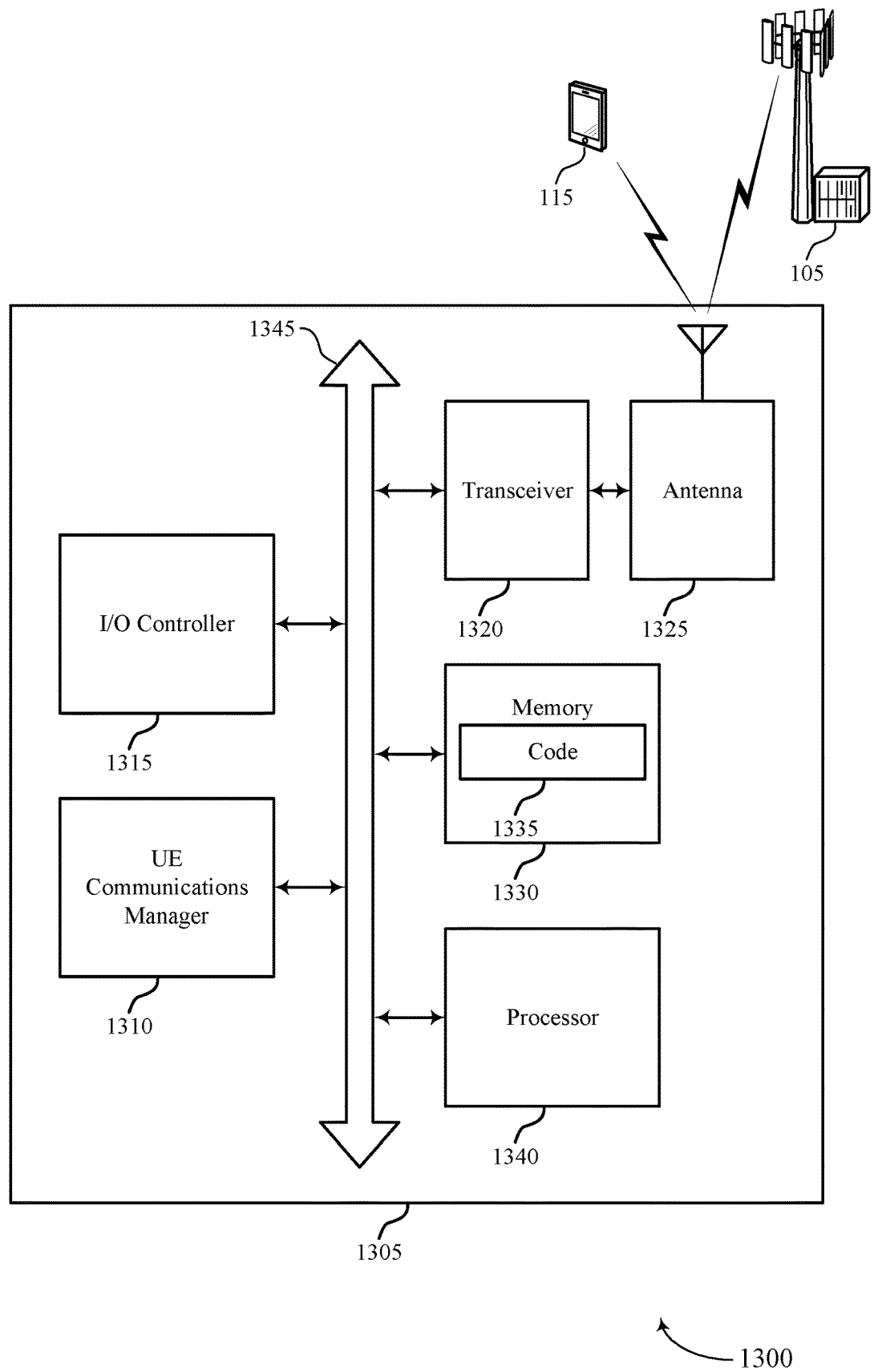
FIG. 13 shows a diagram of a system including a device that supports default QCL for single DCI-based multiple TRPs in accordance with aspects of the present disclosure.

FIG. 13 shows a diagram of a system 1300 including a device 1305 that supports default QCL for single DCI-based multiple TRPs in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a UE communications manager 1310, an I/O controller 1315, a transceiver 1320, an antenna 1325, memory 1330, and a processor 1340. These components may be in electronic communication via one or more buses (e.g., bus 1345).

The UE communications manager 1310 may receive a DCI on a PDCCH, the DCI including one or more of an indication of a set of TCI states related to a PDSCH, one or more receive beams associated with the set of TCI states, or a PDSCH scheme, decode the DCI, determine a temporal period associated with the indication of the set of TCI states, and receive, based on the temporal period, the PDSCH according to one or more of the set of TCI states, the one or more receive beams associated with the set of TCI states, the PDSCH scheme, or one or more default receive beams. The UE communications manager 1310 may also identify, based on a CORESET identifier, a first default receive beam of a set of default receive beams, receive an indication of a second default receive beam of the set of default receive beams, determine the second default receive beam based on the indication, and receive one or more data samples for PDSCHs jointly over the first default receive beam and the second default receive beam. The UE communications manager 1310 may also identify, based on a first CORESET identifier, a first default receive beam of a set of default receive beams, determine, based on a second CORESET identifier, a second default receive beam of the set of default receive beams, and receive one or more data samples for PDSCHs jointly over the first default receive beam and the second default receive beam.

At least one implementation may enable the UE communications manager 1310 to receive a PDSCH based on a temporal period associated with a set of TCI states. Based on implementing the receiving, one or more processors of the device 1305 (for example, processor(s) controlling or incorporated with the communications manager 1310) may promote improvements to power savings and, in some examples, may promote spectral efficiency, higher data rates, and enhanced efficiency for high reliability and low latency operations, among other benefits.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting default QCL for single DCI-based multiple TRPs).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
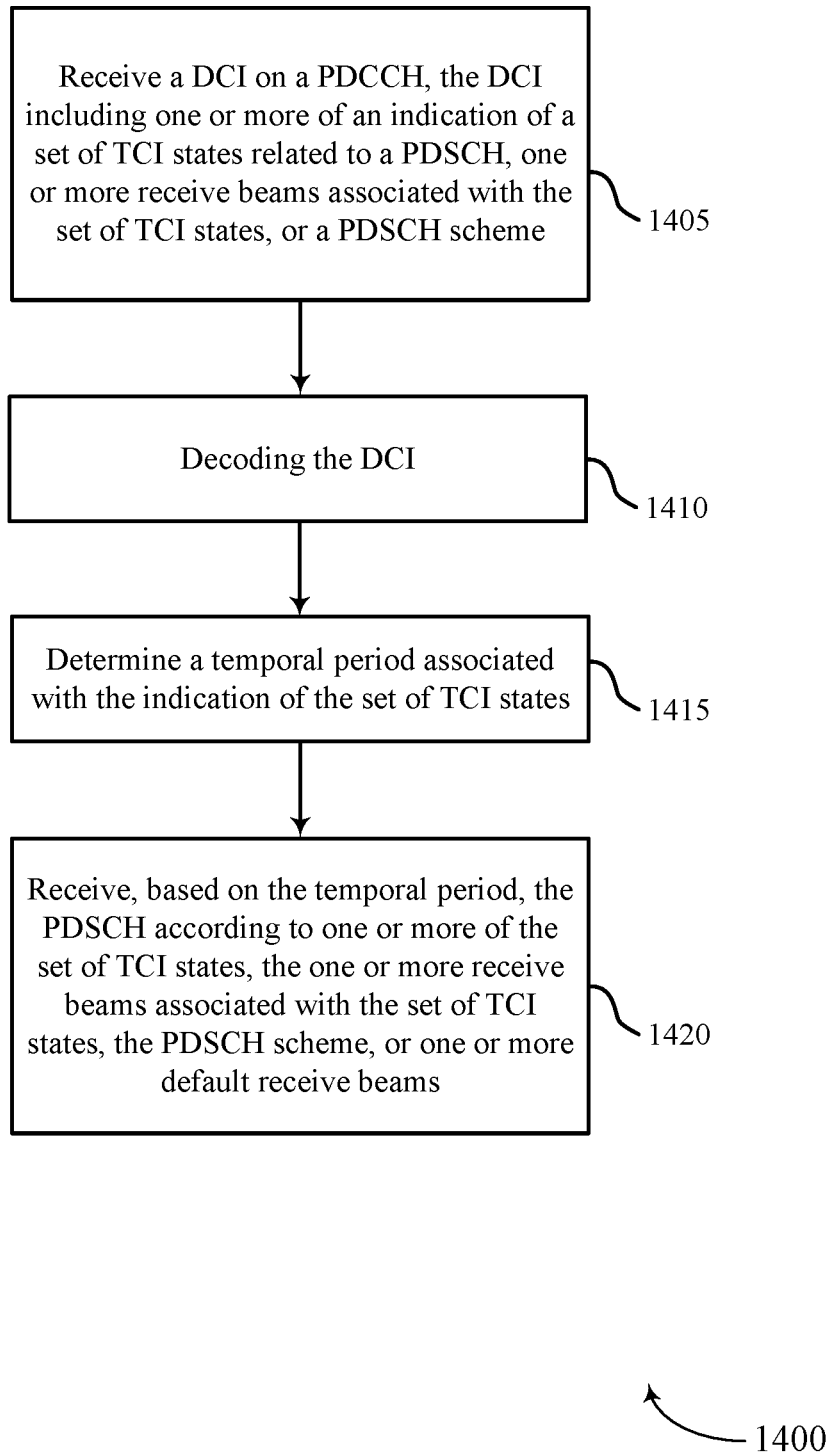
FIGS. 14 through 17 show flowcharts illustrating methods that support default QCL for single DCI-based multiple TRPs in accordance with aspects of the present disclosure.

FIG. 14 shows a flowchart illustrating a method 1400 that supports default QCL for single DCI-based multiple TRPs in accordance with aspects of the present disclosure. The operations of method 1400 may be implemented by a UE 115 or its components as described herein. For example, the operations of method 1400 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1405, the UE may receive a DCI on a PDCCH, the DCI including one or more of an indication of a set of TCI states related to a PDSCH, one or more receive beams associated with the set of TCI states, or a PDSCH scheme. The operations of 1405 may be performed according to the methods described herein. In some examples, aspects of the operations of 1405 may be performed by an information component as described with reference to FIGS. 10 through 13.

At 1410, the UE may decode the DCI. The operations of 1410 may be performed according to the methods described herein. In some examples, aspects of the operations of 1410 may be performed by an information component as described with reference to FIGS. 10 through 13.

At 1415, the UE may determine a temporal period associated with the indication of the set of TCI states. The operations of 1415 may be performed according to the methods described herein. In some examples, aspects of the operations of 1415 may be performed by a timing component as described with reference to FIGS. 10 through 13.

At 1420, the UE may receive, based on the temporal period, the PDSCH according to one or more of the set of TCI states, the one or more receive beams associated with the set of TCI states, the PDSCH scheme, or one or more default receive beams. The operations of 1420 may be performed according to the methods described herein. In some examples, aspects of the operations of 1420 may be performed by a physical channel component as described with reference to FIGS. 10 through 13.

Figure 15:
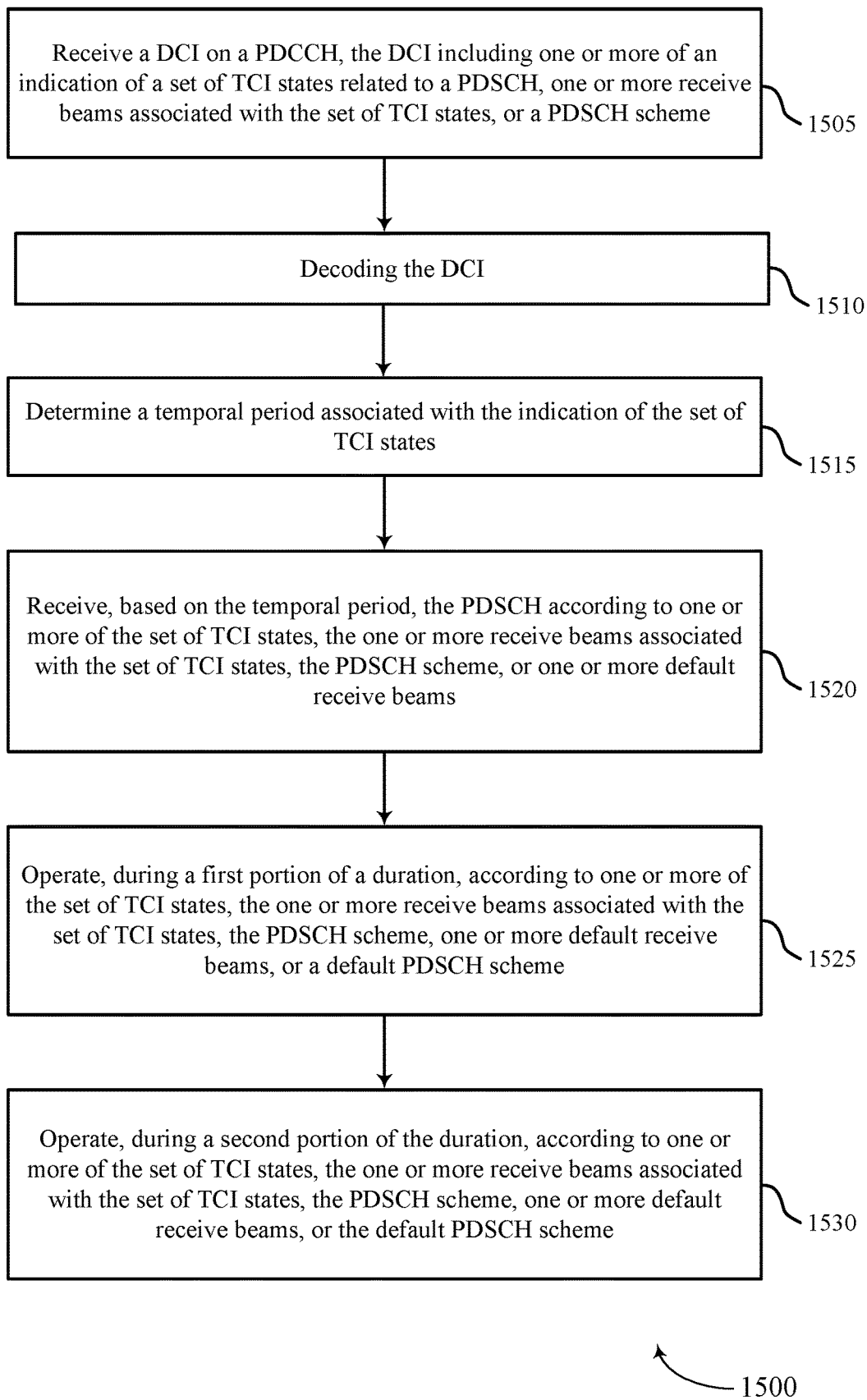

FIG. 15 shows a flowchart illustrating a method 1500 that supports default QCL for single DCI-based multiple TRPs in accordance with aspects of the present disclosure. The operations of method 1500 may be implemented by a UE 115 or its components as described herein. For example, the operations of method 1500 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1505, the UE may receive a DCI on a PDCCH, the DCI including one or more of an indication of a set of TCI states related to a PDSCH, one or more receive beams associated with the set of TCI states, or a PDSCH scheme. The operations of 1505 may be performed according to the methods described herein. In some examples, aspects of the operations of 1505 may be performed by an information component as described with reference to FIGS. 10 through 13.

At 1510, the UE may decode the DCI. The operations of 1510 may be performed according to the methods described herein. In some examples, aspects of the operations of 1510 may be performed by an information component as described with reference to FIGS. 10 through 13.

At 1515, the UE may determine a temporal period associated with the indication of the set of TCI states. The operations of 1515 may be performed according to the methods described herein. In some examples, aspects of the operations of 1515 may be performed by a timing component as described with reference to FIGS. 10 through 13.

At 1520, the UE may receive, based on the temporal period, the PDSCH according to one or more of the set of TCI states, the one or more receive beams associated with the set of TCI states, the PDSCH scheme, or one or more default receive beams. The operations of 1520 may be performed according to the methods described herein. In some examples, aspects of the operations of 1520 may be performed by a physical channel component as described with reference to FIGS. 10 through 13.

At 1525, the UE may operate, during a first portion of a duration, according to one or more of the set of TCI states, the one or more receive beams associated with the set of TCI states, the PDSCH scheme, one or more default receive beams, or a default PDSCH scheme. The operations of 1525 may be performed according to the methods described herein. In some examples, aspects of the operations of 1525 may be performed by a capability component as described with reference to FIGS. 10 through 13.

At 1530, the UE may operate, during a second portion of the duration, according to one or more of the set of TCI states, the one or more receive beams associated with the set of TCI states, the PDSCH scheme, one or more default receive beams, or the default PDSCH scheme. The operations of 1530 may be performed according to the methods described herein. In some examples, aspects of the operations of 1530 may be performed by a capability component as described with reference to FIGS. 10 through 13.

Figure 16:
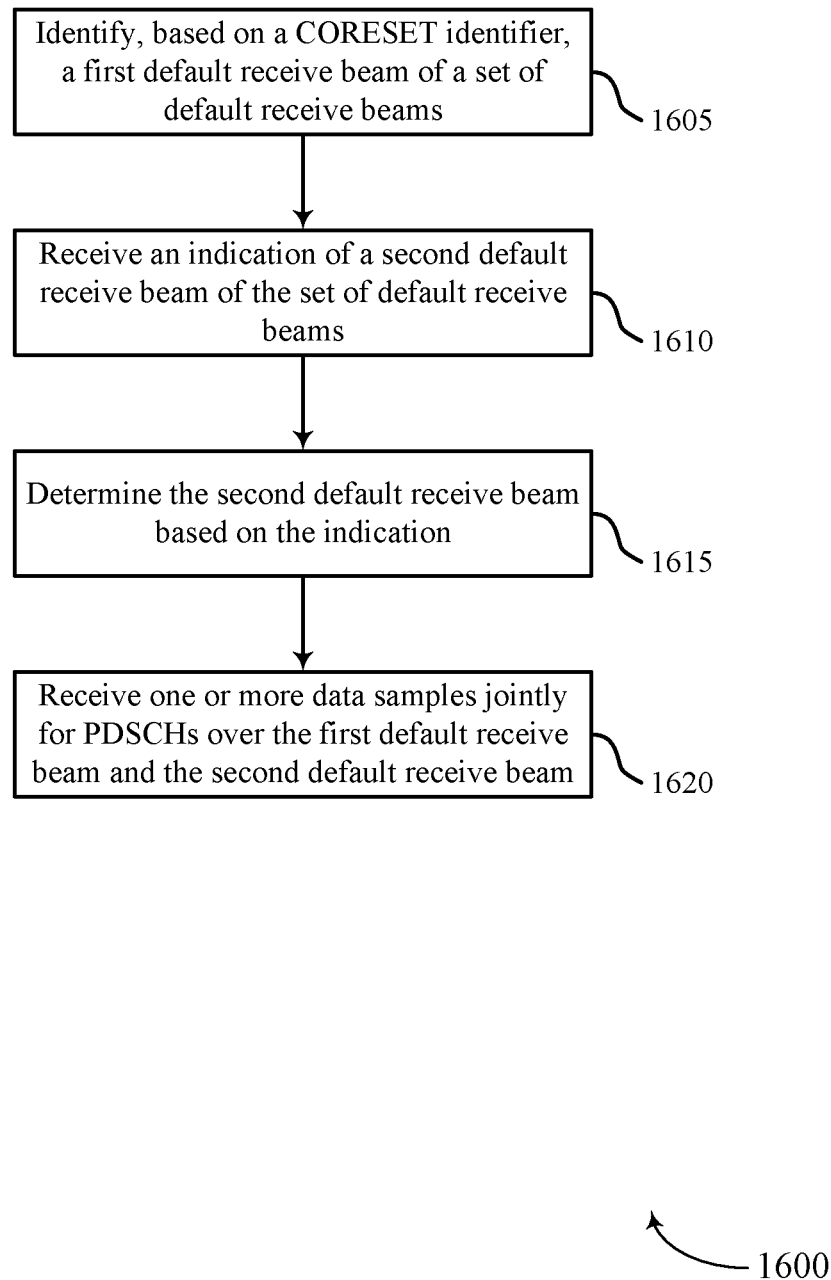

FIG. 16 shows a flowchart illustrating a method 1600 that supports default QCL for single DCI-based multiple TRPs in accordance with aspects of the present disclosure. The operations of method 1600 may be implemented by a UE 115 or its components as described herein. For example, the operations of method 1600 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1605, the UE may identify, based on a CORESET identifier, a first default receive beam of a set of default receive beams. The operations of 1605 may be performed according to the methods described herein. In some examples, aspects of the operations of 1605 may be performed by a beam component as described with reference to FIGS. 10 through 13.

At 1610, the UE may receive an indication of a second default receive beam of the set of default receive beams. The operations of 1610 may be performed according to the methods described herein. In some examples, aspects of the operations of 1610 may be performed by a beam component as described with reference to FIGS. 10 through 13.

At 1615, the UE may determine the second default receive beam based on the indication. The operations of 1615 may be performed according to the methods described herein. In some examples, aspects of the operations of 1615 may be performed by a beam component as described with reference to FIGS. 10 through 13.

At 1620, the UE may receive one or more data samples for PDSCHs jointly over the first default receive beam and the second default receive beam. The operations of 1620 may be performed according to the methods described herein. In some examples, aspects of the operations of 1620 may be performed by a sample component as described with reference to FIGS. 10 through 13.

Figure 17:
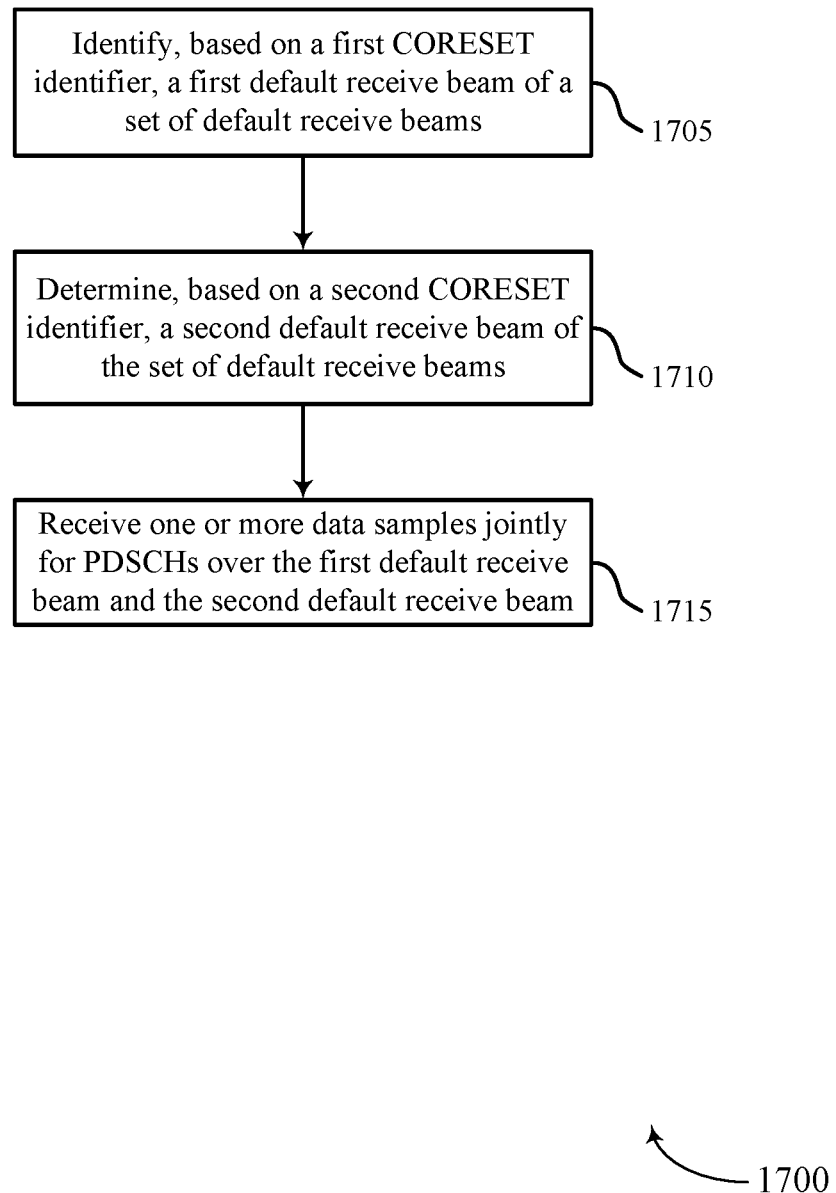

FIG. 17 shows a flowchart illustrating a method 1700 that supports default QCL for single DCI-based multiple TRPs in accordance with aspects of the present disclosure. The operations of method 1700 may be implemented by a UE 115 or its components as described herein. For example, the operations of method 1700 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1705, the UE may identify, based on a first CORESET identifier, a first default receive beam of a set of default receive beams. The operations of 1705 may be performed according to the methods described herein. In some examples, aspects of the operations of 1705 may be performed by a beam component as described with reference to FIGS. 10 through 13.

At 1710, the UE may determine, based on a second CORESET identifier, a second default receive beam of the set of default receive beams. The operations of 1710 may be performed according to the methods described herein. In some examples, aspects of the operations of 1710 may be performed by a beam component as described with reference to FIGS. 10 through 13.

At 1715, the UE may receive one or more data samples for PDSCHs jointly over the first default receive beam and the second default receive beam. The operations of 1715 may be performed according to the methods described herein. In some examples, aspects of the operations of 1715 may be performed by a beam component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
one or more memories storing processor-executable code; and
one or more processors coupled with the one or more memories,
the one or more processors, individually or collectively, configured to execute the code to cause the apparatus to:
receive a downlink control information on a physical downlink control channel, the downlink control information indicating a physical downlink shared channel multiplexing scheme and comprising one or more of an indication of a plurality of transmission configuration indicator states related to a physical downlink shared channel from a plurality of transmission reception points or an indication of one or more receive beams associated with the plurality of transmission configuration indicator states, wherein each of the plurality of transmission configuration indicator states is associated with a different transmission reception point of a plurality of transmission reception points;
decode the downlink control information;
determine a temporal period associated with the indication of the plurality of transmission configuration indicator states and a temporal offset period associated with the physical downlink shared channel from the plurality of transmission reception points; and
receive, from the plurality of transmission reception points and based at least in part on a difference between respective durations of the temporal period and the temporal offset period, the physical downlink shared channel according to the physical downlink shared channel multiplexing scheme and one or more of the plurality of transmission configuration indicator states, the one or more receive beams associated with the plurality of transmission configuration indicator states, or one or more default receive beams.

2. The apparatus of claim 1, wherein the one or more processors are individually or collectively further operable to execute the code to cause the apparatus to:
identify a capability relating to the one or more receive beams; and
select one or more of the plurality of transmission configuration indicator states, the one or more receive beams associated with the plurality of transmission configuration indicator states, or the one or more default receive beams, based at least in part on the capability,
wherein receiving the physical downlink shared channel is based at least in part on the selecting.

3. The apparatus of claim 2, wherein the one or more processors are individually or collectively further operable to execute the code to cause the apparatus to:
include an indication of the temporal period in the capability; and
transmit the capability carrying the indication of the temporal period.

4. The apparatus of claim 3, wherein the one or more processors are individually or collectively further operable to execute the code to cause the apparatus to:
identify a transmission configuration indicator field in the downlink control information,
wherein the transmission configuration indicator field indicates one or more transmission configuration indicator states of the plurality of transmission configuration indicator states.

5. The apparatus of claim 4, wherein the one or more processors are individually or collectively further operable to execute the code:
determine that the temporal offset period is greater than or equal to the temporal period, wherein, to receive the physical downlink shared channel, the one or more processors are individually or collectively operable to execute the code to cause the apparatus to:
receive, based at least in part on the temporal offset period being greater than or equal to the temporal period, the physical downlink shared channel according to the one or more transmission configuration indicator states of the plurality of transmission configuration indicator states.

6. The apparatus of claim 3, wherein the one or more processors are individually or collectively further operable to execute the code to cause the apparatus to:
determine a second temporal period to decode the downlink control information; and
transmit, with the capability, a second indication of the second temporal period to decode the downlink control information.

7. The apparatus of claim 6, wherein the temporal period is different from the second temporal period.

8. The apparatus of claim 7, wherein the second temporal period is smaller than the temporal period.

9. The apparatus of claim 6, wherein the one or more processors are individually or collectively further operable to execute the code to cause the apparatus to:
determine that the temporal offset period is greater than or equal to the second temporal period; and
determine that the temporal offset period is lesser than or equal to the temporal period, wherein receiving the physical downlink shared channel comprises:
receive, based at least in part on one or more of the temporal offset period being greater than or equal to the second temporal period or the temporal offset period being lesser than or equal to the temporal period, the physical downlink shared channel according to one or more of the physical downlink shared channel multiplexing scheme or the one or more default receive beams for the physical downlink shared channel.

10. The apparatus of claim 6, wherein the one or more processors are individually or collectively further operable to execute the code to cause the apparatus to:
determine that the temporal offset period is lesser than the second temporal period, wherein receiving the physical downlink shared channel comprises:
receive, based at least in part on the temporal offset period being lesser than the second temporal period, the physical downlink shared channel according to one or more of the one or more default receive beams or a default physical downlink shared channel scheme for the physical downlink shared channel.

11. The apparatus of claim 6, wherein the one or more processors are individually or collectively further operable to execute the code to cause the apparatus to:
receive, based at least in part on the temporal period, the physical downlink shared channel according to a default physical downlink shared channel scheme, wherein the default physical downlink shared channel scheme is based at least in part on a set of preconfigured physical downlink shared channel schemes.

12. The apparatus of claim 6, wherein the second temporal period comprises a quantity of symbols.

13. The apparatus of claim 6, wherein the one or more processors are individually or collectively further operable to execute the code to cause the apparatus to:
determine a subcarrier spacing based at least in part on the capability, wherein determining the second temporal period is based at least in part on the subcarrier spacing.

14. The apparatus of claim 1, wherein the temporal offset period comprises a duration from an ending symbol of the physical downlink control channel carrying the downlink control information to a beginning symbol of the physical downlink shared channel, wherein the physical downlink control channel schedules the physical downlink shared channel.

15. The apparatus of claim 1, wherein one or more processors are individually or collectively further operable to execute the code to cause the apparatus to:
determine that the temporal offset period is lesser than the temporal period;
receive, based at least in part on that the temporal offset period being lesser than the temporal period, a first data sample set in accordance with the one or more default receive beams and the physical downlink shared channel multiplexing scheme; and
receive, based at least in part on that the temporal offset period being lesser than the temporal period, a second data sample set in accordance with the one or more default receive beams and the physical downlink shared channel multiplexing scheme.

16. The apparatus of claim 15, wherein the one or more processors are individually or collectively further operable to execute the code to cause the apparatus to:
store one or more of the first data sample set or the second data sample set based at least in part on that the temporal offset period being lesser than the temporal period, wherein the stored first data sample set or the stored second data sample set correspond to a first antenna panel or a second antenna panel.

17. The apparatus of claim 15, wherein the one or more processors are individually or collectively further operable to execute the code to cause the apparatus to:
process one or more of the first data sample set or the second data sample set based at least in part on the physical downlink shared channel multiplexing scheme, wherein the physical downlink shared channel multiplexing scheme comprises a space division multiplexing scheme.

18. The apparatus of claim 15, wherein the one or more processors are individually or collectively further operable to execute the code to cause the apparatus to:
process one or more of the first data sample set or the second data sample set based at least in part on the plurality of transmission configuration indicator states.

19. The apparatus of claim 15, wherein the one or more processors are individually or collectively further operable to execute the code to cause the apparatus to:
process one or more of the first data sample set or the second data sample set based at least in part on the physical downlink shared channel multiplexing scheme, wherein the physical downlink shared channel multiplexing scheme comprises a frequency division multiplexing scheme, wherein, to process one or more of the first data sample set or the second data sample set, the one or more processors are individually or collectively operable to execute the code to cause the apparatus to:
process the first data sample set in a first set of resource blocks corresponding to a first transmission configuration indicator state of the plurality of transmission configuration indicator states; and
process the second data sample set in a second set of resource blocks corresponding to a second transmission configuration indicator state of the plurality of transmission configuration indicator states.

20. The apparatus of claim 15, wherein the one or more processors are individually or collectively further operable to execute the code to cause the apparatus to:
process one or more of the first data sample set or the second data sample set based at least in part on the physical downlink shared channel multiplexing scheme, wherein the physical downlink shared channel multiplexing scheme comprises a time division multiplexing scheme, wherein, to process one or more of the first data sample set or the second data sample set, the one or more processors are individually or collectively operable to execute the code to cause the apparatus to:
process the first data sample set in a first plurality of transmission time intervals corresponding to a first transmission configuration indicator state of the plurality of transmission configuration indicator states; and
process the second data sample set in a second set of set of transmission time intervals corresponding to a second transmission configuration indicator state of the plurality of transmission configuration indicator states.

21. The apparatus of claim 1, wherein the temporal period relates to one or more of a quantity of symbols to receive the physical downlink control channel and apply spatial quasi-colocation information for the physical downlink shared channel.

22. The apparatus of claim 1, wherein the one or more processors are individually or collectively further operable to execute the code to cause the apparatus to:
determine a quantity of symbols to receive the physical downlink control channel based at least in part on the temporal period;
apply spatial quasi-colocation information for the physical downlink shared channel; and
receive the physical downlink shared channel based at least in part on the spatial quasi-colocation information.

23. The apparatus of claim 1, wherein the one or more default receive beams are based at least in part on a set of preconfigured receive beams.

24. The apparatus of claim 1, wherein the physical downlink shared channel multiplexing scheme comprises a single transmission configuration indicator state scheme, a time division multiplexing scheme, a frequency division multiplexing scheme, a space division multiplexing scheme, or a code division multiplexing scheme.

25. The apparatus of claim 1, wherein the one or more processors are individually or collectively further operable to execute the code to cause the apparatus to:
receive the physical downlink shared channel over a duration, wherein the duration comprises a transmission occasion, a transmission time interval, and the transmission time interval comprising one or more orthogonal frequency-division multiplexing symbols, one or more mini-slots, one or more slots, or a combination thereof.

26. A method for wireless communication, comprising:
receiving a downlink control information on a physical downlink control channel, the downlink control information indicating a physical downlink shared channel multiplexing scheme and comprising one or more of an indication of a plurality of transmission configuration indicator states related to a physical downlink shared channel from a plurality of transmission reception points or an indication of one or more receive beams associated with the plurality of transmission configuration indicator states, wherein each of the plurality of transmission configuration indicator states is associated with a different transmission reception point of a plurality of transmission reception points;
decoding the downlink control information;
determining a temporal period associated with the indication of the plurality of transmission configuration indicator states and a temporal offset period associated with the physical downlink shared channel from the plurality of transmission reception points; and
receiving, from the plurality of transmission reception points and based at least in part on a difference between respective durations of the temporal period and the temporal offset period, the physical downlink shared channel according to the physical downlink shared channel multiplexing scheme and one or more of the plurality of transmission configuration indicator states, the one or more receive beams associated with the plurality of transmission configuration indicator states, or one or more default receive beams.

27. The method of claim 26, further comprising:
identifying a capability relating to the one or more receive beams; and
selecting one or more of the plurality of transmission configuration indicator states, the one or more receive beams associated with the plurality of transmission configuration indicator states, or the one or more default receive beams, based at least in part on the capability,
wherein receiving the physical downlink shared channel is based at least in part on the selecting.

28. The method of claim 27, further comprising:
including an indication of the temporal period in the capability; and
transmitting the capability carrying the indication of the temporal period.

29. The method of claim 28, further comprising:
identifying a transmission configuration indicator field in the downlink control information,
wherein the transmission configuration indicator field indicates one or more transmission configuration indicator states of the plurality of transmission configuration indicator states.

30. The method of claim 29, further comprising:
determining that the temporal offset period is greater than or equal to the temporal period, wherein receiving the physical downlink shared channel comprises:
receiving, based at least in part on the temporal offset period being greater than or equal to the temporal period, the physical downlink shared channel according to the one or more transmission configuration indicator states of the plurality of transmission configuration indicator states.

31. The method of claim 26, wherein the temporal offset period comprises a duration from an ending symbol of the physical downlink control channel carrying the downlink control information to a beginning symbol of the physical downlink shared channel, wherein the physical downlink control channel schedules the physical downlink shared channel.

32. The method of claim 26, further comprising:
determining that the temporal offset period is lesser than the temporal period;
receiving, based at least in part on that the temporal offset period being lesser than the temporal period, a first data sample set in accordance with the one or more default receive beams and the physical downlink shared channel multiplexing scheme; and
receiving, based at least in part on that the temporal offset period being lesser than the temporal period, a second data sample set in accordance with the one or more default receive beams and the physical downlink shared channel multiplexing scheme.

33. The method of claim 32, further comprising:
storing one or more of the first data sample set or the second data sample set based at least in part on that the temporal offset period being lesser than the temporal period, wherein the stored first data sample set or the stored second data sample set correspond to a first antenna panel or a second antenna panel.

34. The method of claim 32, further comprising:
processing one or more of the first data sample set or the second data sample set based at least in part on the physical downlink shared channel multiplexing scheme, wherein the physical downlink shared channel multiplexing scheme comprises a space division multiplexing scheme.

35. The method of claim 32, further comprising:
processing one or more of the first data sample set or the second data sample set based at least in part on the plurality of transmission configuration indicator states.

36. The method of claim 32, further comprising:
processing one or more of the first data sample set or the second data sample set based at least in part on the physical downlink shared channel multiplexing scheme, wherein the physical downlink shared channel multiplexing scheme comprises a frequency division multiplexing scheme, wherein processing one or more of the first data sample set or the second data sample set comprises:
processing the first data sample set in a first set of resource blocks corresponding to a first transmission configuration indicator state of the plurality of transmission configuration indicator states; and
processing the second data sample set in a second set of resource blocks corresponding to a second transmission configuration indicator state of the plurality of transmission configuration indicator states.

37. The method of claim 32, further comprising:
processing one or more of the first data sample set or the second data sample set based at least in part on the physical downlink shared channel multiplexing scheme, wherein the physical downlink shared channel multiplexing scheme comprises a time division multiplexing scheme, wherein processing one or more of the first data sample set or the second data sample set comprises:
processing the first data sample set in a first set of transmission time intervals corresponding to a first transmission configuration indicator state of the plurality of transmission configuration indicator states; and
processing the second data sample set in a second set of set of transmission time intervals corresponding to a second transmission configuration indicator state of the plurality of transmission configuration indicator states.

* * * * *